(12) United States Patent
Jau et al.

(10) Patent No.: US 12,203,773 B1
(45) Date of Patent: Jan. 21, 2025

(54) VISUAL LOCALIZATION FOR AUTONOMOUS GROUND VEHICLES

(71) Applicant: Amazon Technologies, Inc., Seattle, WA (US)

(72) Inventors: You-Yi Jau, Seattle, WA (US); Aziz Umit Batur, Seattle, WA (US); Chen Zhang, Wuxi (CN)

(73) Assignee: Amazon Technologies, Inc., Seattle, WA (US)

( * ) Notice: Subject to any disclaimer, the term of this patent is extended or adjusted under 35 U.S.C. 154(b) by 291 days.

(21) Appl. No.: 17/853,433

(22) Filed: Jun. 29, 2022

(51) Int. Cl.
*G05D 1/00* (2024.01)
*G01C 21/00* (2006.01)

(52) U.S. Cl.
CPC ..... *G01C 21/3837* (2020.08); *G01C 21/3807* (2020.08)

(58) Field of Classification Search
CPC .. G01C 21/3807; G01C 21/3837; G06T 7/74; G06T 10/751; G06T 2207/20081; G06T 2207/20084; G06T 2207/30252; G06V 10/7715; G06V 10/82; G06V 20/56
See application file for complete search history.

(56) References Cited

U.S. PATENT DOCUMENTS

| | | | |
|---|---|---|---|
| 4,865,248 A | 9/1989 | Barth | |
| 4,954,962 A | 9/1990 | Evans, Jr. et al. | |
| 5,040,116 A | 8/1991 | Evans, Jr. et al. | |
| 5,301,114 A | 4/1994 | Mitchell | |
| 5,386,462 A | 1/1995 | Schlamp | |
| 5,995,898 A | 11/1999 | Tuttle | |
| 6,344,796 B1 | 2/2002 | Ogilvie et al. | |
| 6,426,699 B1 | 7/2002 | Porter | |
| 6,504,530 B1 | 1/2003 | Wilson et al. | |

(Continued)

FOREIGN PATENT DOCUMENTS

| EP | 2228779 A2 | 9/2010 |
|---|---|---|
| WO | 2015134376 A1 | 9/2015 |

OTHER PUBLICATIONS

Arandjelovic, R. et al. "NetVLAD: CNN Architecture for Weakly Supervised Place Recognition." Proceedings of the IEEE Conference on Computer Vision and Pattern Recognition. 2016, 17 pages.

(Continued)

*Primary Examiner* — Dale Moyer
(74) *Attorney, Agent, or Firm* — Athorus, PLLC

(57) ABSTRACT

Autonomous ground vehicles that are outfitted with onboard cameras and configured to travel within an area or region are programmed with a previously generated visual map of the area or region. The visual map includes a plurality of map points from which images were previously captured and processed to determine visual features of such images. In the event of a loss of one or more position signals, such as GPS signals, the autonomous ground vehicles capture images using one or more of the cameras, and process the images to determine visual features from such images. The visual features determined from such images are compared to the visual map. Positions of one or more of the map points are identified as most likely corresponding to a position of the autonomous ground vehicle where visual features associated with such map points are similar to the visual features determined from such images.

20 Claims, 22 Drawing Sheets

(56) References Cited

U.S. PATENT DOCUMENTS

| | | |
|---|---|---|
| 6,690,997 B2 | 2/2004 | Rivalto |
| 6,694,217 B2 | 2/2004 | Bloom |
| 6,919,803 B2 | 7/2005 | Breed |
| 6,961,711 B1 | 11/2005 | Chee |
| 6,970,838 B1 | 11/2005 | Kamath et al. |
| 7,129,817 B2 | 10/2006 | Yamagishi |
| 7,133,743 B2 | 11/2006 | Tilles et al. |
| 7,188,513 B2 | 3/2007 | Wilson |
| 7,337,686 B2 | 3/2008 | Sagi-Dolev |
| 7,337,944 B2 | 3/2008 | Devar |
| 7,339,993 B1 | 3/2008 | Brooks et al. |
| 7,409,291 B2 | 8/2008 | Pasolini et al. |
| 8,321,128 B2 | 11/2012 | Park |
| 8,532,862 B2 | 9/2013 | Neff |
| 8,571,743 B1 | 10/2013 | Cullinane |
| 8,688,306 B1 | 4/2014 | Nemec et al. |
| 8,738,213 B1 | 5/2014 | Szybalski et al. |
| 8,855,847 B2 | 10/2014 | Uehara |
| 9,079,587 B1 | 7/2015 | Rupp et al. |
| 9,120,484 B1 | 9/2015 | Ferguson et al. |
| 9,147,296 B2 | 9/2015 | Ricci |
| 9,201,421 B1 | 12/2015 | Fairfield et al. |
| 9,294,474 B1 | 3/2016 | Alikhani |
| 9,381,916 B1 | 7/2016 | Zhu et al. |
| 9,440,647 B1 | 9/2016 | Sucan et al. |
| 9,558,664 B1 | 1/2017 | Gaebler et al. |
| 9,718,564 B1 | 8/2017 | Beckman et al. |
| 2001/0045449 A1 | 11/2001 | Shannon |
| 2002/0016726 A1 | 2/2002 | Ross |
| 2002/0087375 A1 | 7/2002 | Griffin et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2003/0040980 A1 | 2/2003 | Nakajima et al. |
| 2003/0097047 A1 | 5/2003 | Woltermann et al. |
| 2003/0141411 A1 | 7/2003 | Pandya et al. |
| 2003/0162523 A1 | 8/2003 | Kapolka et al. |
| 2004/0172167 A1 | 9/2004 | Pasolini et al. |
| 2005/0182518 A1* | 8/2005 | Karlsson ............... G06V 10/84 700/253 |
| 2006/0136237 A1 | 6/2006 | Spiegel et al. |
| 2006/0178140 A1 | 8/2006 | Smith et al. |
| 2007/0005609 A1 | 1/2007 | Breed |
| 2007/0016496 A1 | 1/2007 | Bar et al. |
| 2007/0073552 A1 | 3/2007 | Hileman |
| 2007/0150375 A1 | 6/2007 | Yang |
| 2007/0170237 A1 | 7/2007 | Neff |
| 2007/0244614 A1 | 10/2007 | Nathanson |
| 2007/0293978 A1 | 12/2007 | Wurman et al. |
| 2008/0059068 A1 | 3/2008 | Strelow et al. |
| 2008/0150679 A1 | 6/2008 | Bloomfield |
| 2008/0154659 A1 | 6/2008 | Bettes et al. |
| 2008/0161986 A1 | 7/2008 | Breed |
| 2008/0167817 A1 | 7/2008 | Hessler et al. |
| 2008/0301009 A1 | 12/2008 | Plaster et al. |
| 2009/0005985 A1 | 1/2009 | Basnayake |
| 2009/0062974 A1 | 3/2009 | Tamamoto et al. |
| 2009/0063166 A1 | 3/2009 | Palmer |
| 2009/0106124 A1 | 4/2009 | Yang |
| 2009/0149985 A1 | 6/2009 | Chirnomas |
| 2009/0236470 A1 | 9/2009 | Goossen et al. |
| 2009/0247186 A1 | 10/2009 | Ji et al. |
| 2009/0299903 A1 | 12/2009 | Hung et al. |
| 2009/0314883 A1 | 12/2009 | Arlton et al. |
| 2010/0012573 A1 | 1/2010 | Dendel et al. |
| 2010/0057360 A1 | 3/2010 | Ohkubo |
| 2010/0121573 A1 | 5/2010 | Imafuku et al. |
| 2010/0125403 A1 | 5/2010 | Clark et al. |
| 2010/0157061 A1 | 6/2010 | Katsman et al. |
| 2010/0241355 A1 | 9/2010 | Park |
| 2010/0250134 A1 | 9/2010 | Bornstein et al. |
| 2010/0312461 A1 | 12/2010 | Haynie et al. |
| 2011/0035149 A1 | 2/2011 | McAndrew et al. |
| 2011/0066377 A1 | 3/2011 | Takaoka |
| 2011/0071759 A1 | 3/2011 | Pande et al. |
| 2011/0112764 A1 | 5/2011 | Trum |
| 2011/0125403 A1 | 5/2011 | Smith |
| 2011/0208496 A1 | 8/2011 | Bando et al. |
| 2011/0264311 A1 | 10/2011 | Lee et al. |
| 2012/0039694 A1 | 2/2012 | Suzanne |
| 2012/0083960 A1 | 4/2012 | Zhu et al. |
| 2012/0109419 A1 | 5/2012 | Mercado |
| 2012/0219397 A1 | 8/2012 | Baker |
| 2013/0073477 A1 | 3/2013 | Grinberg |
| 2013/0081245 A1 | 4/2013 | Vavrina et al. |
| 2013/0148123 A1 | 6/2013 | Hayashi |
| 2013/0214925 A1 | 8/2013 | Weiss |
| 2013/0218799 A1 | 8/2013 | Lehmann et al. |
| 2013/0231824 A1 | 9/2013 | Wilson et al. |
| 2013/0238170 A1 | 9/2013 | Klinger |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2013/0297099 A1 | 11/2013 | Rovik |
| 2014/0022055 A1 | 1/2014 | Levien et al. |
| 2014/0030444 A1 | 1/2014 | Swaminathan et al. |
| 2014/0032034 A1 | 1/2014 | Raptopoulos et al. |
| 2014/0052661 A1 | 2/2014 | Shakes et al. |
| 2014/0081507 A1 | 3/2014 | Urmson et al. |
| 2014/0095009 A1 | 4/2014 | Oshima et al. |
| 2014/0136282 A1 | 5/2014 | Fedele |
| 2014/0136414 A1 | 5/2014 | Abhyanker |
| 2014/0156133 A1 | 6/2014 | Cullinane et al. |
| 2014/0172290 A1 | 6/2014 | Prokhorov et al. |
| 2014/0188376 A1 | 7/2014 | Gordon |
| 2014/0200737 A1 | 7/2014 | Lortz et al. |
| 2014/0244678 A1 | 8/2014 | Zamer et al. |
| 2014/0254896 A1 | 9/2014 | Zhou et al. |
| 2014/0278052 A1 | 9/2014 | Slavin et al. |
| 2015/0006005 A1 | 1/2015 | Yu et al. |
| 2015/0069968 A1 | 3/2015 | Pounds |
| 2015/0102154 A1 | 4/2015 | Duncan et al. |
| 2015/0120602 A1 | 4/2015 | Huffman et al. |
| 2015/0129716 A1 | 5/2015 | Yoffe |
| 2015/0153175 A1 | 6/2015 | Skaaksrud |
| 2015/0153735 A1 | 6/2015 | Clarke et al. |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0193005 A1 | 7/2015 | Censo et al. |
| 2015/0227882 A1 | 8/2015 | Bhatt |
| 2015/0241878 A1 | 8/2015 | Crombez et al. |
| 2015/0246727 A1 | 9/2015 | Masticola et al. |
| 2015/0259078 A1 | 9/2015 | Filipovic et al. |
| 2015/0268665 A1 | 9/2015 | Ludwick et al. |
| 2015/0291032 A1 | 10/2015 | Kim et al. |
| 2015/0317597 A1 | 11/2015 | Shucker et al. |
| 2015/0332206 A1 | 11/2015 | Trew et al. |
| 2015/0345966 A1 | 12/2015 | Meuleau |
| 2015/0345971 A1 | 12/2015 | Meuleau et al. |
| 2015/0346727 A1 | 12/2015 | Ramanujam |
| 2015/0348112 A1 | 12/2015 | Ramanujam |
| 2015/0348335 A1 | 12/2015 | Ramanujam |
| 2015/0363986 A1 | 12/2015 | Hoyos et al. |
| 2015/0367850 A1 | 12/2015 | Clarke et al. |
| 2015/0370251 A1 | 12/2015 | Siegel et al. |
| 2016/0009413 A1 | 1/2016 | Lee et al. |
| 2016/0025973 A1 | 1/2016 | Guttag et al. |
| 2016/0033966 A1 | 2/2016 | Farris et al. |
| 2016/0068156 A1 | 3/2016 | Horii |
| 2016/0085565 A1 | 3/2016 | Arcese et al. |
| 2016/0093212 A1 | 3/2016 | Barfield et al. |
| 2016/0104099 A1 | 4/2016 | Villamar |
| 2016/0114488 A1 | 4/2016 | Medina et al. |
| 2016/0144734 A1 | 5/2016 | Wang et al. |
| 2016/0144959 A1 | 5/2016 | Meffert |
| 2016/0144982 A1 | 5/2016 | Sugumaran |
| 2016/0207627 A1 | 7/2016 | Hoareau et al. |
| 2016/0209220 A1 | 7/2016 | Laetz |
| 2016/0209845 A1 | 7/2016 | Kojo et al. |

(56) References Cited

U.S. PATENT DOCUMENTS

| | | | |
|---|---|---|---|
| 2016/0216711 A1 | 7/2016 | Srivastava et al. | |
| 2016/0247404 A1 | 8/2016 | Srivastava et al. | |
| 2016/0257401 A1 | 9/2016 | Buchmueller et al. | |
| 2016/0266578 A1 | 9/2016 | Douglas et al. | |
| 2016/0288796 A1 | 10/2016 | Yuan | |
| 2016/0299233 A1 | 10/2016 | Levien et al. | |
| 2016/0300400 A1 | 10/2016 | Namikawa | |
| 2016/0301698 A1 | 10/2016 | Katara et al. | |
| 2016/0307449 A1 | 10/2016 | Gordon et al. | |
| 2016/0334229 A1 | 11/2016 | Ross et al. | |
| 2016/0364989 A1 | 12/2016 | Speasl et al. | |
| 2016/0370193 A1 | 12/2016 | Maischberger et al. | |
| 2017/0010613 A1 | 1/2017 | Fukumoto | |
| 2017/0032315 A1 | 2/2017 | Gupta et al. | |
| 2017/0096222 A1 | 4/2017 | Spinelli et al. | |
| 2017/0098378 A1 | 4/2017 | Soundararajan et al. | |
| 2017/0101017 A1 | 4/2017 | Streett | |
| 2017/0164319 A1 | 6/2017 | Skaaksrud et al. | |
| 2017/0167881 A1 | 6/2017 | Rander et al. | |
| 2017/0301232 A1 | 10/2017 | Xu et al. | |
| 2018/0134286 A1 | 5/2018 | Yi et al. | |
| 2018/0307223 A1 | 10/2018 | Peeters et al. | |
| 2019/0042859 A1 | 2/2019 | Schubert et al. | |
| 2019/0146500 A1* | 5/2019 | Yalla | G01C 21/3407 701/25 |
| 2020/0249698 A1 | 8/2020 | Lu et al. | |
| 2021/0293547 A1* | 9/2021 | Kitaura | G01C 21/3602 |
| 2022/0333950 A1* | 10/2022 | Akbarzadeh | G08G 1/04 |

OTHER PUBLICATIONS

DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/ http://www.dhl.com/content/dam/downloads/g0/about_us/logistics_insights/dhl_self_driving_vehicles.pdf), 39 pages.

DHL Trend Research, "Unmanned Aerial Vehicles in Logistics: A DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

Mike Murphy, "Google wants to deliver packages from self-driving trucks," published Feb. 9, 2016, URL: https://qz.com/613277/google-wants-to-deliver-packages-from-self-driving-trucks/, 4 pages.

Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 bages.

URL: https://web.archive.org/web/20160804001046/https://www.starship.xyz/, download date: Aug. 4, 2016, 21 pages.

* cited by examiner

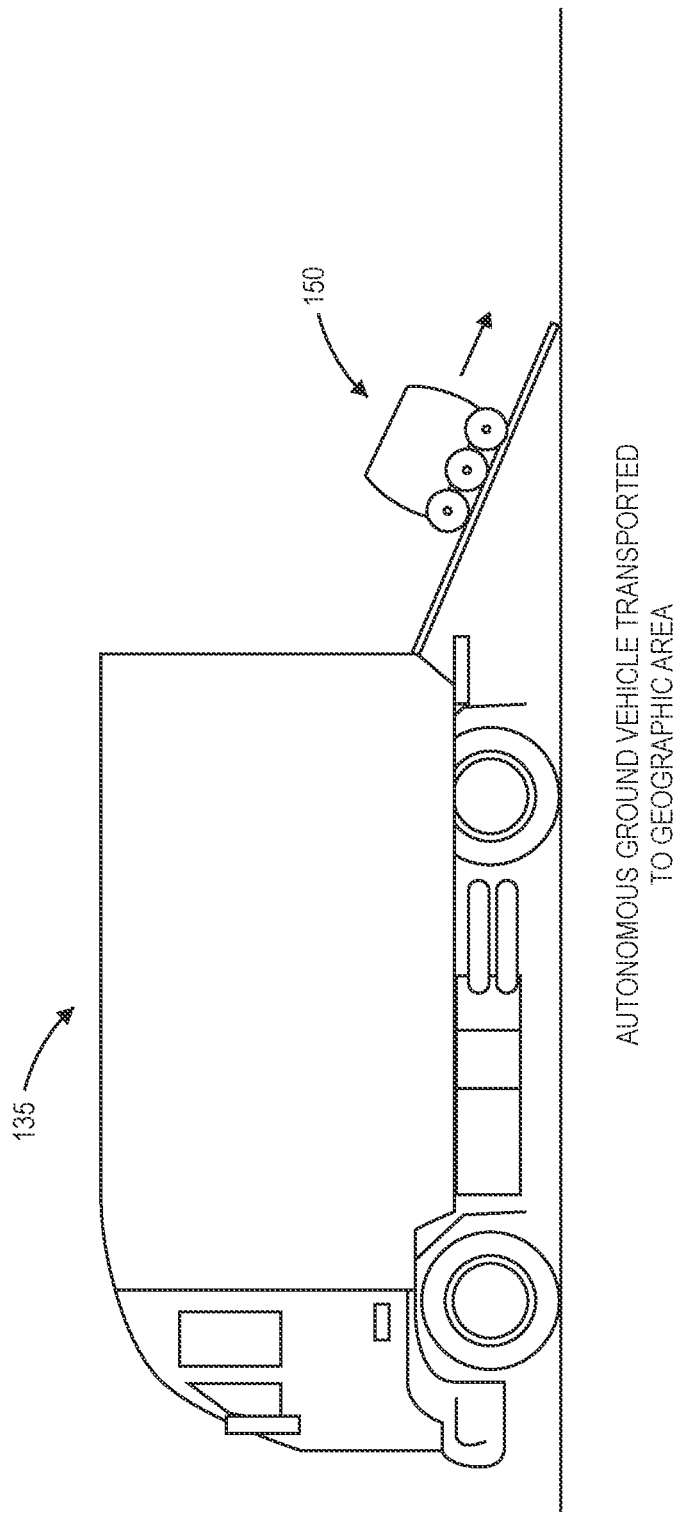

AUTONOMOUS GROUND VEHICLE UNABLE TO RECEIVE POSITION SIGNALS

AUTONOMOUS GROUND VEHICLE CAPTURES IMAGES

IMAGES PROCESSED TO GENERATE QUERY FEATURES

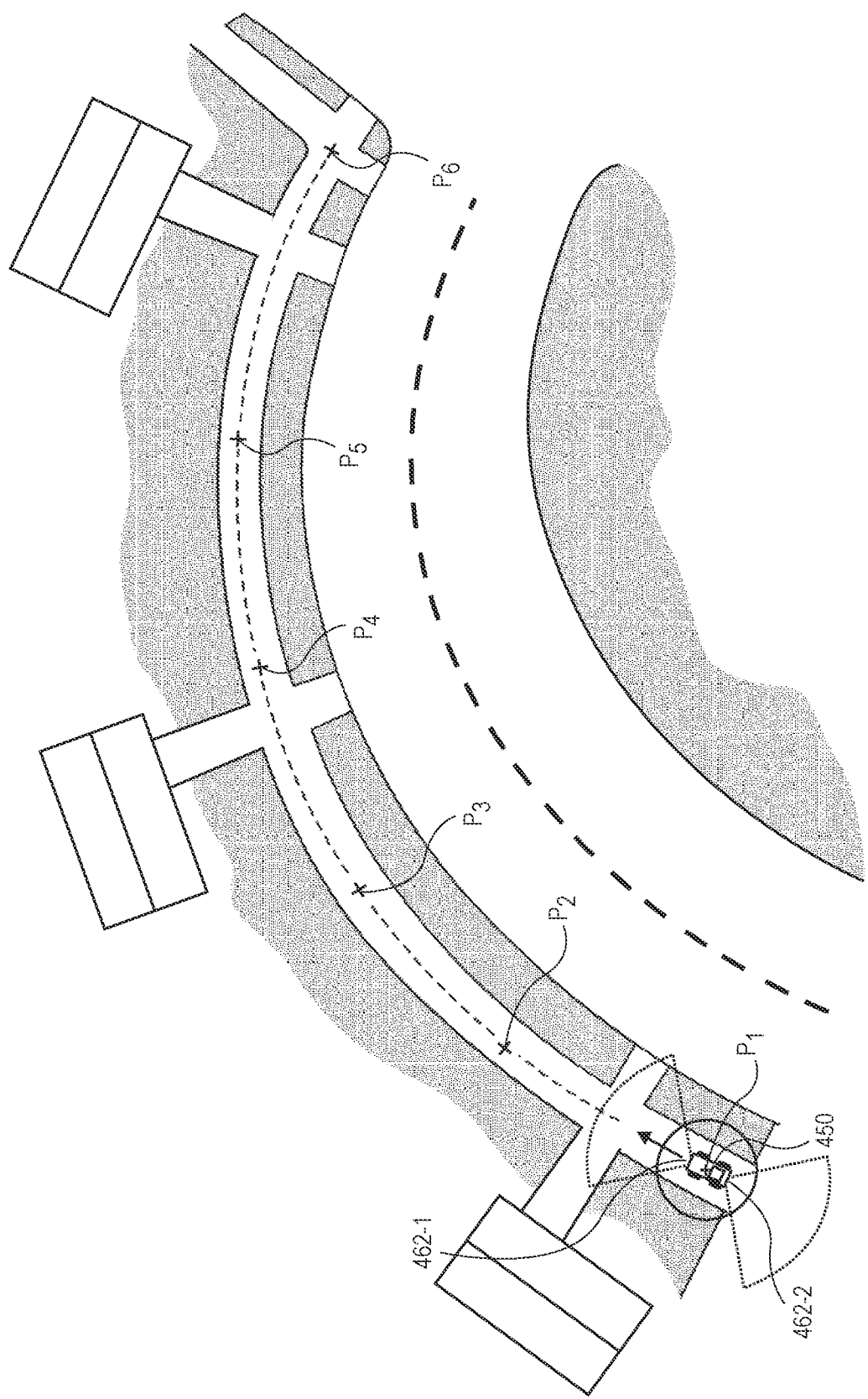

VISUAL MAP OF GEOGRAPHIC AREA INCLUDING VISUAL FEATURES STORED IN ASSOCIATION WITH MAP POINTS

VISUAL LOCALIZATION FOR AUTONOMOUS GROUND VEHICLES

BACKGROUND

Autonomous ground vehicles, which are sometimes called unmanned ground vehicles or autonomous mobile robots, are being increasingly utilized in the performance of a number of commercial applications, personal tasks, and other functions. For example, autonomous ground vehicles have been utilized to complete deliveries of food products or other items to locations or personnel indoors or outdoors, to survey ground conditions, to monitor traffic, or to identify situations requiring alternative or additional assistance from humans or other machines.

Autonomous ground vehicles are often programmed or configured to autonomously navigate from one location to another location under their own power. Many autonomous ground vehicles are outfitted with components for determining information regarding a vehicle's position, orientation, velocity or acceleration. For example, some such mobile computer devices may include Global Positioning System (or "GPS") transceivers for determining positions using data received from one or more orbiting satellites, or cellular transceivers configured to estimate (e.g., triangulate) a position using signals received from one or more cellular telephone network towers or other network sources. Moreover, many autonomous ground vehicles also include compasses for determining directions, gyroscopes for determining orientations and accelerometers for sensing accelerations.

A GPS-enabled autonomous ground vehicle may determine its position by interpreting signals that are received from multiple GPS satellites, and use that position to determine a path or route to another position, via any number of intervening waypoints, or to determine whether the autonomous ground vehicle is traveling in accordance with such a path or route. Where three or more such signals are interpreted, the autonomous ground vehicle may be determined to be located at a specific point to within a certain degree of accuracy or tolerance, commonly on the order of two to ten meters.

Occasionally, position information determined using GPS satellites and GPS-enabled equipment may be inaccurate, irrelevant or unavailable. For example, like any computer-based system, most GPS-enabled equipment requires an initialization period during which the GPS position information determined by such equipment is unreliable. Furthermore, where an autonomous ground vehicle operates in an environment including many natural or artificial obstructions, such as tree limbs, office towers, mountains, walls or ceilings, the receipt of GPS signals by a GPS-enabled autonomous ground vehicle may be delayed or otherwise interpreted as having arrived in an untimely manner.

BRIEF DESCRIPTION OF THE DRAWINGS

FIGS. 1A through 1I are views of aspects of one system for visual localization of autonomous ground vehicles in accordance with implementations of the present disclosure.

FIGS. 4A through 4C are views of aspects of one system for visual localization of autonomous ground vehicles in accordance with implementations of the present disclosure.

DETAILED DESCRIPTION

As is set forth in greater detail below, the present disclosure is directed to visual localization of autonomous ground vehicles. More specifically, some implementations of the systems and methods disclosed herein are directed to generating visual maps based on images captured by cameras provided aboard ground vehicles or other systems at various positions within a geographic area, and processing the images to determine visual features of such images, e.g., using a convolutional neural network or another machine learning model, or in any other manner. The visual map may be a data structure or other representation in which the visual features determined at the various positions are stored in association with such positions, which may be referenced as map points.

An autonomous ground vehicle, or any other vehicle, that is configured for operation within the geographic area may be programmed with the visual map. Upon an inability of the autonomous ground vehicle to determine its own position for any reason, the autonomous ground vehicle may capture images (e.g., query images) by each of a plurality of onboard cameras, and process such images to determine visual features (e.g., query features) therefrom. The visual features determined therefrom may be compared to visual features of one or more of the map points. A position of the autonomous ground vehicle may be predicted or determined to correspond with a position of one or more of the map points having visual features that most closely correspond to the visual features determined from the images captured by the autonomous ground vehicle.

Figure 1A:
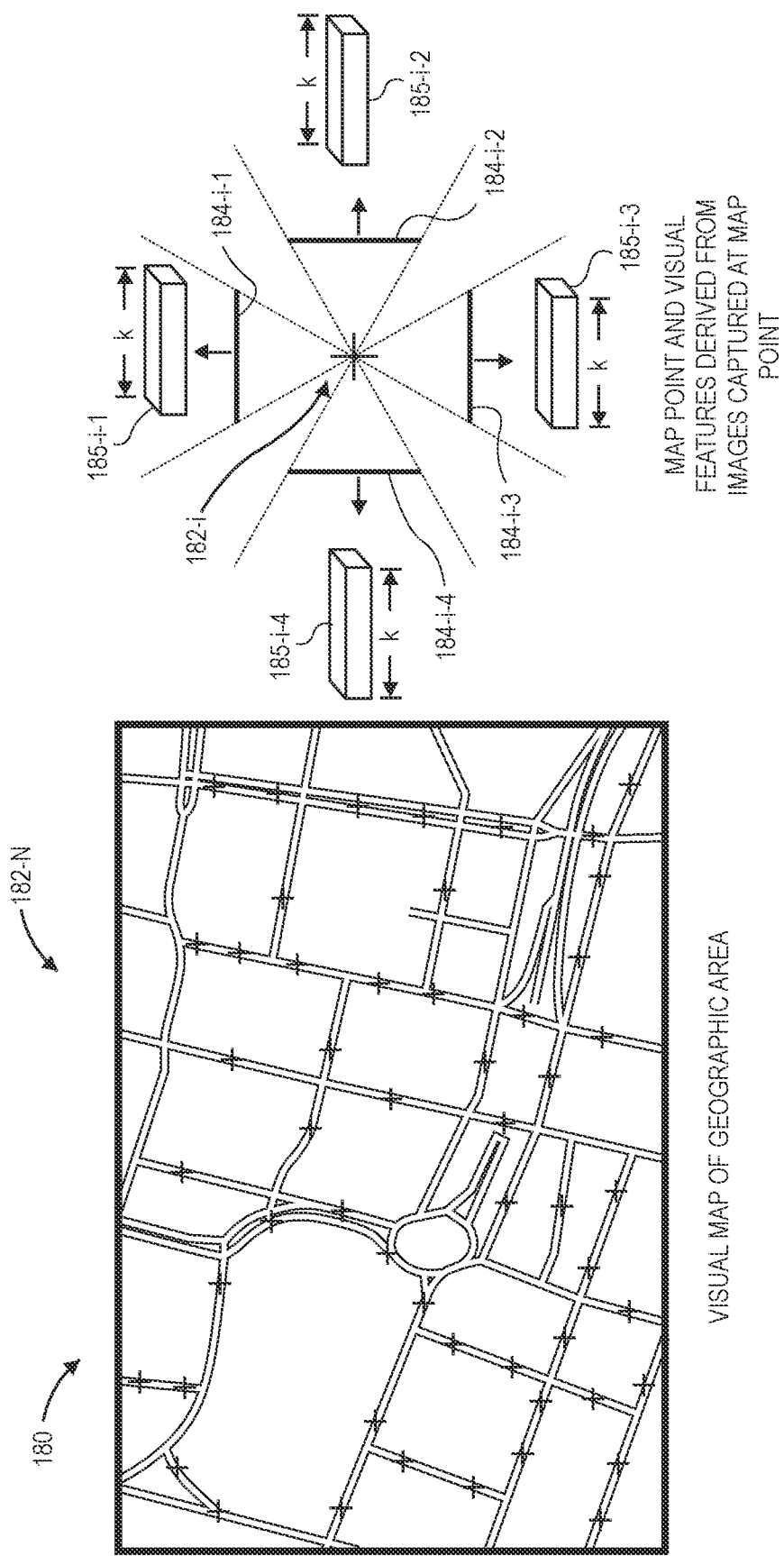

Referring to FIGS. 1A through 1I, views of aspects of one system for visual localization of autonomous ground vehicles in accordance with implementations of the present disclosure are shown. As is shown in FIG. 1A, a visual map 180 of a geographic area includes a plurality of n map points 182-N, each of which corresponds to a discrete point in three-dimensional space within the geographic area, and is associated with a plurality of sets of visual features (e.g., image features) derived from images captured at such points. The visual map 180 may be represented as a data structure, e.g., a matrix, an array or another set of data, and may but need not be maintained or stored as a layer or another overlay associated with a geographic map of the geographic area, or in any other manner.

For example, as is also shown in FIG. 1A, a representative map point 182-$i$ of the map points 182-N is associated with a set of visual features 185-$i$-1, 185-$i$-2, 185-$i$-3, 185-$i$-4, each of which is derived from an image 184-$i$-1, 184-$i$-2, 184-$i$-3, 184-$i$-4, captured by a camera or another imaging device at the map point 182-$i$. In some implementations, each of the sets of visual features 185-$i$-1, 185-$i$-2, 185-$i$-3, 185-$i$-4 may have been determined by providing one of the images 184-$i$-1, 184-$i$-2, 184-$i$-3, 184-$i$-4 as an input to a machine learning model, such as an artificial neural network (e.g., a convolutional neural network) that is trained to derive visual features from visual images, and deriving one of the sets of visual features 185-$i$-1, 185-$i$-2, 185-$i$-3, 185-$i$-4 based on an output received in response to the input. In some implementations, each of the images 184-$i$-1, 184-$i$-2, 184-$i$-3, 184-$i$-4 may be preprocessed prior to providing the images 184-$i$-1, 184-$i$-2, 184-$i$-3, 184-$i$-4 as inputs to the machine learning model. Moreover, each of the sets of visual features 185-$i$-1, 185-$i$-2, 185-$i$-3, 185-$i$-4 may be stored in association with coordinates or other information or data representing a position of the map point 182-$i$, and with an angle or other information or data representing a heading or an orientation of a camera that captured such images at the map point 182-$i$, or a heading or an orientation of a vehicle to which the camera was mounted when such images were captured.

Each of the sets of visual features 185-$i$-1, 185-$i$-2, 185-$i$-3, 185-$i$-4 may represent visual attributes of a respective one of the images 184-$i$-1, 184-$i$-2, 184-$i$-3, 184-$i$-4 in any manner. For example, in some implementations, each of the sets of visual features 185-$i$-1, 185-$i$-2, 185-$i$-3, 185-$i$-4 may be a vector having a dimension K. Alternatively, the sets of visual features 185-$i$-1, 185-$i$-2, 185-$i$-3, 185-$i$-4 may be represented in any other manner. Moreover, in some implementations, an output (e.g., a set of visual features) received from the machine learning model in response to an input comprising one of the images 184-$i$-1, 184-$i$-2, 184-$i$-3, 184-$i$-4 may be processed by providing the output to a principal component analysis to identify or extract significant aspects of the output determined from such images, or to reduce a dimensionality of the output, and each of the sets of visual features 185-$i$-1, 185-$i$-2, 185-$i$-3, 185-$i$-4 may be determined following the principal component analysis.

Each of the images 184-$i$-1, 184-$i$-2, 184-$i$-3, 184-$i$-4 may have been captured by a camera provided on a vehicle or another system (e.g., a mapping vehicle or mapping robot) provided at the map point 182-$i$. In some implementations, the vehicle may be a manned vehicle, an unmanned vehicle, an autonomous vehicle, a semi-autonomous vehicle, or any other vehicle configured to travel on ground surfaces at any speeds and on any courses within the geographic area and to capture images by one or more cameras provided thereon. In some implementations, the vehicle may include cameras aligned with fields of view extending forward or aft of the vehicle, or to port and starboard sides of the vehicle, or in any other direction with respect to an orientation of the vehicle, or a principal axis of the vehicle, at a given map point. When the images 184-$i$-1, 184-$i$-2, 184-$i$-3, 184-$i$-4 are captured by the camera or cameras of the vehicle, a position and an orientation of the vehicle or of the respective cameras that captured such images may be determined, e.g., by one or more position sensors or other systems provided on the vehicle, and stored in association with each of the images 184-$i$-1, 184-$i$-2, 184-$i$-3, 184-$i$-4, which are georeferenced or otherwise synchronized with the position of the vehicle. The position of the vehicle at a time when each of the images 184-$i$-1, 184-$i$-2, 184-$i$-3, 184-$i$-4 are captured is used to define the map point 182-$i$.

Furthermore, the vehicle may include any number of cameras, e.g., two, three, four, or more, each of which may have axes of orientation that are fixed or variable with respect to an axis of orientation of the vehicle. For example, referring again to FIG. 1A, each of the images 184-$i$-1, 184-$i$-2, 184-$i$-3, 184-$i$-4 may have been respectively captured by four individual cameras provided on a vehicle at the map point 182-$i$. Alternatively, in some implementations, each of the images 184-$i$-1, 184-$i$-2, 184-$i$-3, 184-$i$-4 may have been captured by a single camera, or by fewer than four cameras, which may be configured for rotation or repositioning to vary fields of view of the camera, and to capture images from such fields of view, at the map point 182-$i$. The fields of view from which each of the images 184-$i$-1, 184-$i$-2, 184-$i$-3, 184-$i$-4 is captured may but need not cover an entire (e.g., 360°) perimeter surrounding the map point 182-$i$.

Figure 1B:
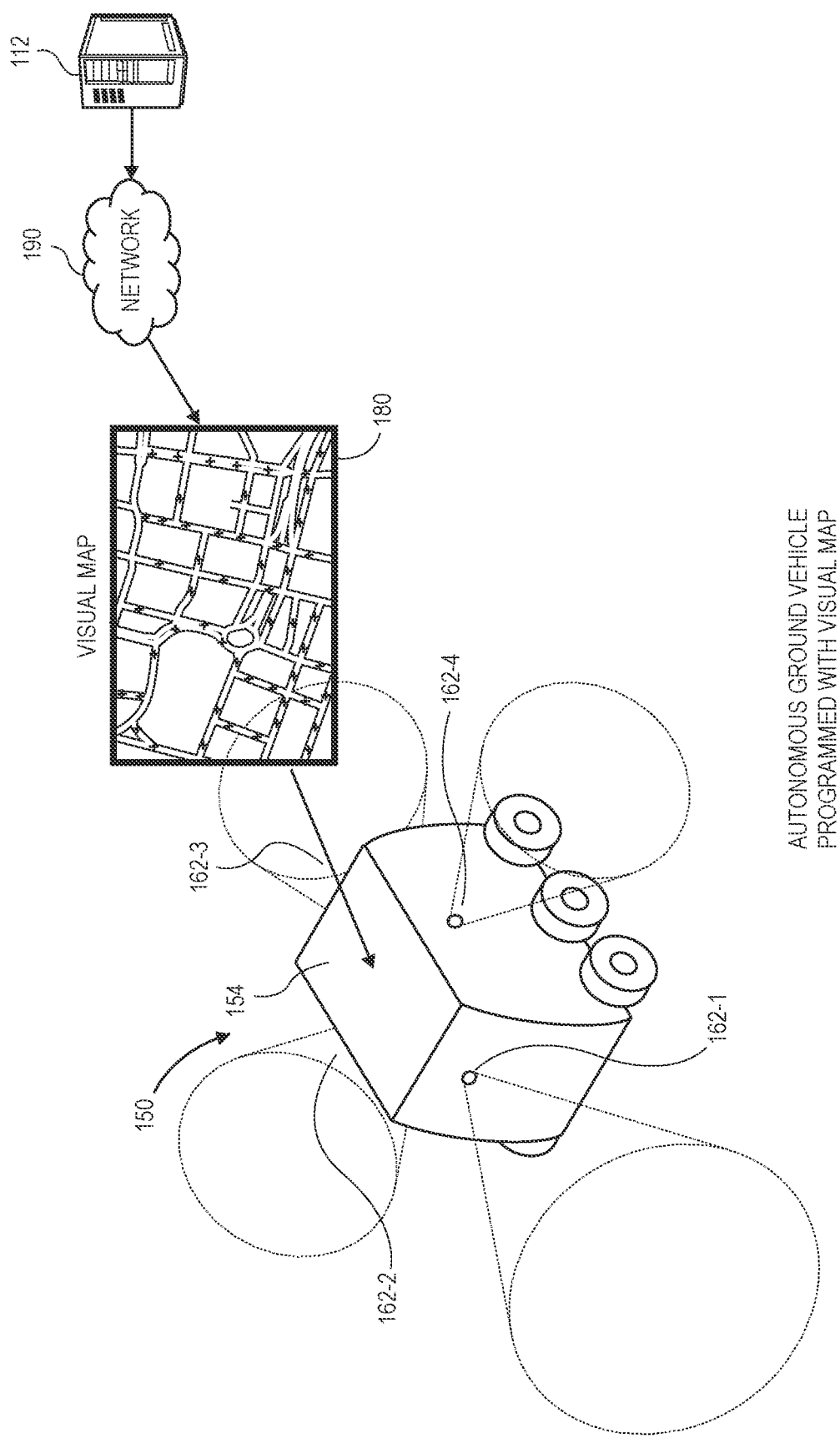

As is shown in FIG. 1B, when the visual map 180 has been generated for a geographic area, the visual map 180 may be programmed into one or more memory components 154 provided aboard an autonomous ground vehicle 150 that is assigned, designated, configured or instructed to execute one or more missions or tasks within the geographic area, such as deliveries of items to destinations within the geographic area. For example, information or data representing the visual map 180 may be transmitted by a server 112 (or another computer device or system) to the autonomous ground vehicle 150 over a network 190, or over one or more networks, which may include the Internet in whole or in part. The information or data representing the visual map 180 may be transmitted in one or more synchronous or asynchronous in messages, or in any manner, either separately or concurrently with one or more sets of instructions to perform one or more missions or tasks (e.g., deliveries of items) within the geographic area.

Additionally, as is shown in FIG. 1B, the autonomous ground vehicle 150 includes a plurality of cameras 162-1, 162-2, 162-3, 162-4, with fields of view extending forward and aft of the autonomous ground vehicle 150, and to port and starboard (e.g., left and right) sides of the autonomous ground vehicle 150. Each of the cameras 162-1, 162-2, 162-3, 162-4 may be configured to capture color, grayscale or black-and-white images, or any other images (e.g., depth images), in accordance with the present disclosure. Alternatively, the cameras 162-1, 162-2, 162-3, 162-4 may have camera axes aligned in any orientation with respect to one or more principal axes of the autonomous ground vehicle 150, e.g., a normal axis (or yaw axis), a lateral axis (or pitch axis), or a longitudinal axis (or roll axis) of the autonomous ground vehicle 150. For example, in some implementations, two of the cameras 162-1, 162-2, 162-3, 162-4 may be aligned with fields of view extending forward of the autonomous ground vehicle 150, at equal angles from but on opposite sides of the longitudinal axis of the autonomous ground vehicle 150, e.g., forty-five degrees to the left of and forty-five degrees to the right of the longitudinal axis. Similarly, two of the cameras 162-1, 162-2, 162-3, 162-4 may be aligned with fields of view extending aft of the autonomous ground vehicle 150, at equal angles from but on opposite sides of the longitudinal axis of the autonomous ground vehicle 150, e.g., forty-five degrees to the left of and forty-five degrees to the right of the longitudinal axis. Alternatively, the cameras 162-1, 162-2, 162-3, 162-4 may be aligned in any other orientation with respect to one or more principal axes of the autonomous ground vehicle 150.

Additionally, the autonomous ground vehicle 150 may further include one or more other sensors for capturing information or data, such as one or more additional imaging devices (not shown), which may be aligned in any orientation with respect to a direction of travel of the autonomous ground vehicle 150, such as forward of the autonomous ground vehicle 150, or to port or starboard sides of the autonomous ground vehicle 150, or in any other orientation.

As is shown in FIG. 1C, the autonomous ground vehicle 150 is transported to the geographic area associated with the visual map 180 by a carrier vehicle 135, which may be a truck, a trailer, a container ship, a cargo ship, an aerial vehicle, or any other vehicle, and released at a location within the geographic area. The carrier vehicle 135 may be manned or autonomously operated, and may be associated with a marketplace, a fulfillment center, a materials handling facility (e.g., a retail establishment), a third-party delivery service, or any other entity or facility.

Figure 1D:
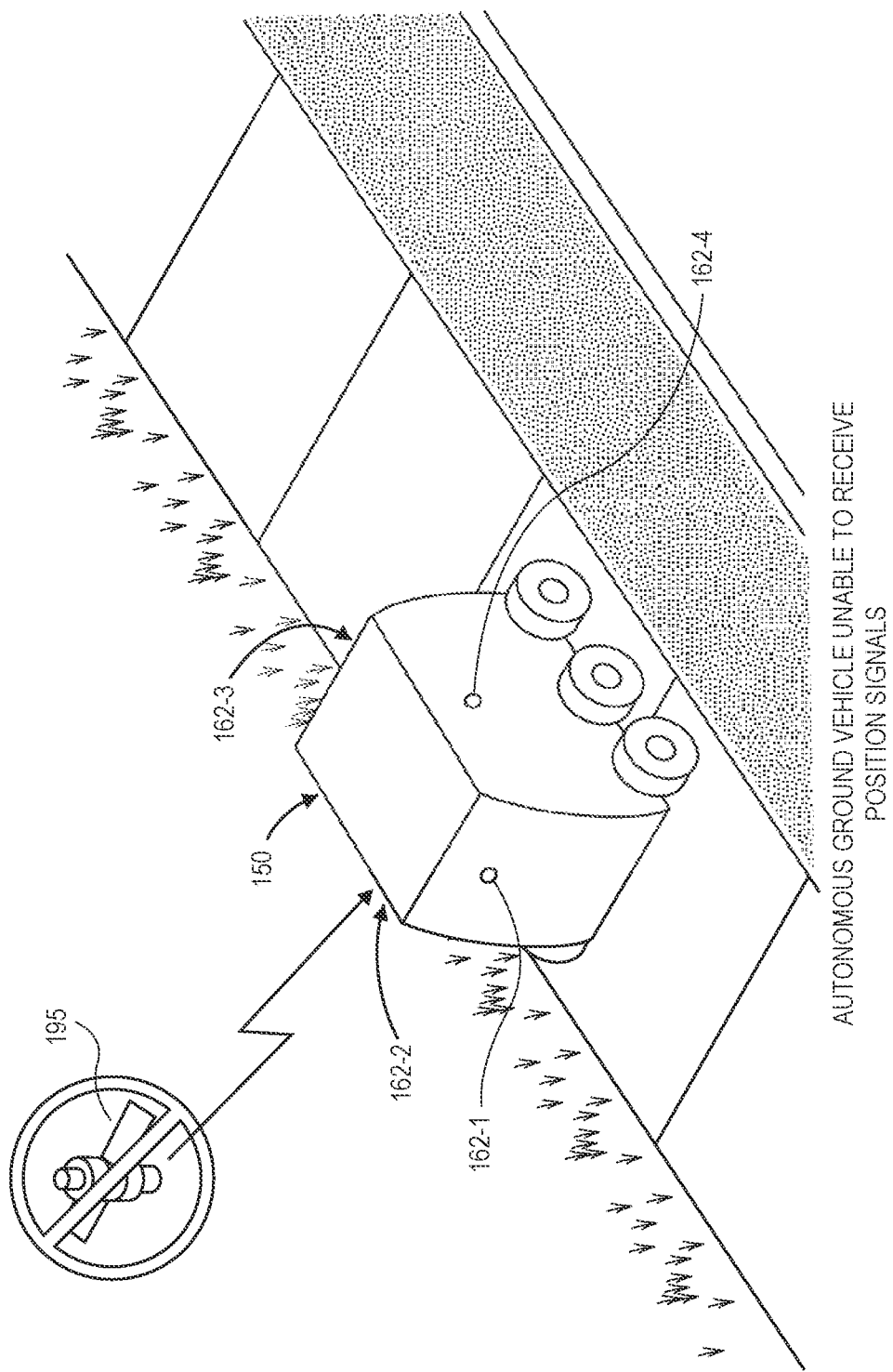

As is shown in FIG. 1D, upon arriving at the geographic area, the autonomous ground vehicle 150 may determine that it is unable to confirm a position of the autonomous ground vehicle 150 in three-dimensional space, e.g., by one or more onboard GPS sensors, for any reason. For example, in some implementations, an initialization process for one or more position sensors (e.g., a GPS transceiver) provided aboard the autonomous ground vehicle 150 may fail or otherwise not complete satisfactorily. Alternatively, the autonomous ground vehicle 150 may be unable to receive a sufficient number of position signals, e.g., three or more, from one or more orbiting GPS satellites 195 or from any other source, or the reliability, accuracy or validity of such position signals may not be confirmed.

Figure 1E:
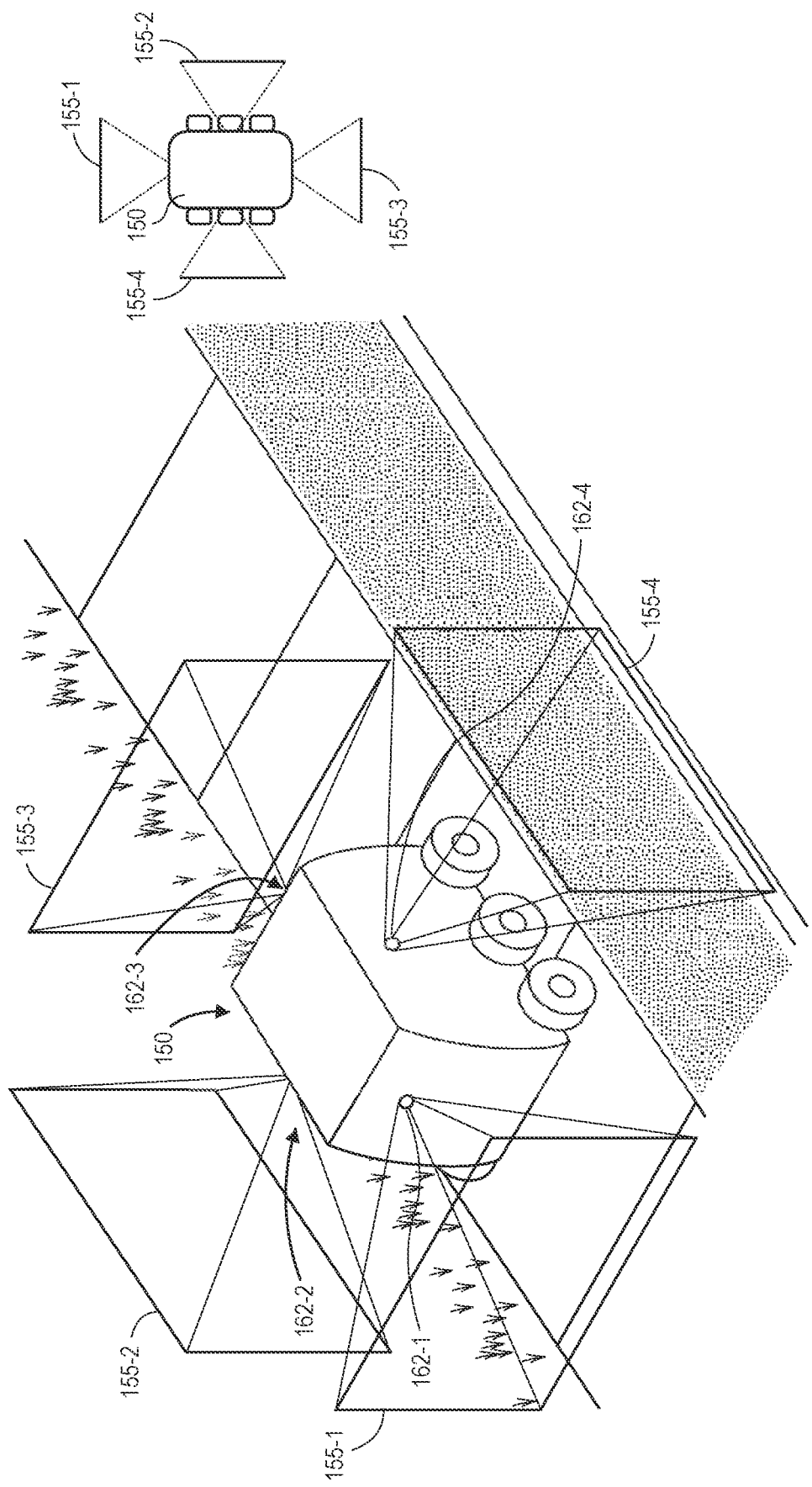

In accordance with implementations of the present disclosure, in response to determining that a position of the autonomous ground vehicle 150 may not be confirmed, the autonomous ground vehicle 150 may query for its position using the visual map 180. As is shown in FIG. 1E, the autonomous ground vehicle 150 captures images 155-1, 155-2, 155-3, 155-4 (e.g., query images) using each of the cameras 162-1, 162-2, 162-3, 162-4. For example, in response to determining that a position of the autonomous ground vehicle 150 may not be confirmed, the autonomous ground vehicle 150 may cause each of the cameras 162-1, 162-2, 162-3, 162-4 to capture an image from their respective fields of view at the same time, or at approximately the same time.

Figure 1F:
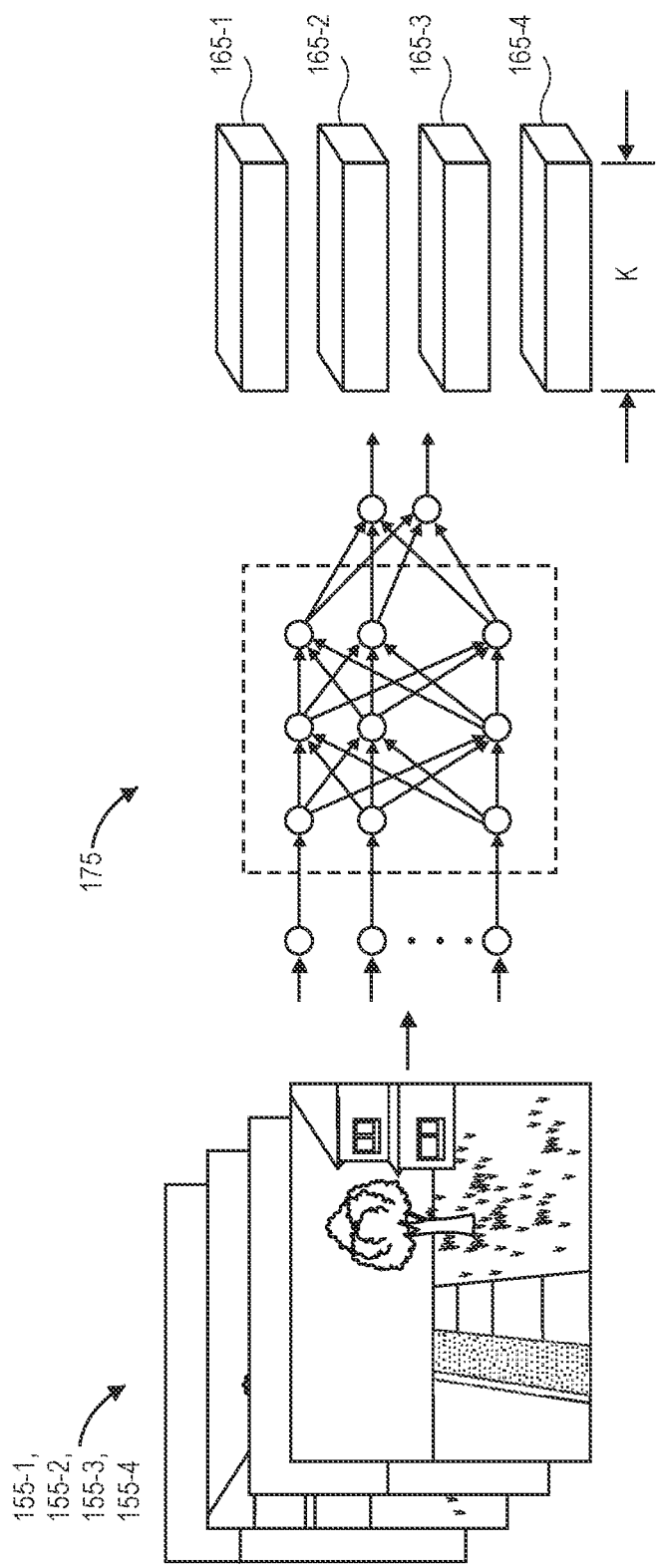

As is shown in FIG. 1F, each of the images 155-1, 155-2, 155-3, 155-4 captured by the autonomous ground vehicle 150 is processed to determine visual features, or query features 165-1, 165-2, 165-3, 165-4, from such images. For example, each of the images 155-1, 155-2, 155-3, 155-4 may be independently provided to a machine learning model 175 that is executed by one or more processor units provided aboard the autonomous ground vehicle 150 and trained to generate visual features (e.g., query features) from images. In some implementations, the machine learning model 175 may include one or more artificial neural networks (e.g., convolutional neural networks) that are trained to map pixels of inputted imaging data to desired outputs by adjusting strengths of connections between one or more neurons, which are sometimes called synaptic weights. The machine learning model 175 may have any number of layers, including an input layer, an output layer, and any number of intervening hidden layers. Each of the neurons in a layer may receive an input and generate an output in accordance with an activation or energy function, with parameters corresponding to the various strengths or synaptic weights.

In some implementations, the machine learning model 175 may be a heterogeneous neural network, and each of the neurons within the network may be understood to have different activation or energy functions. The machine learning model 175 may be trained by redefining or adjusting strengths or weights of connections between neurons in the various layers of the network, in order to provide an output that most closely approximates or associates with the input to the maximum practicable extent. In some implementations, the machine learning model 175 may be characterized as either a feedforward neural network or a recurrent neural network, and may be fully or partially connected. In a feedforward neural network, e.g., a convolutional neural network, information may specifically flow in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers is connected to all of the neurons in a subsequent layer. By contrast, in a sparsely connected neural network architecture, the number of activations of each of the neurons is limited, such as by a sparsity parameter.

The machine learning model 175 may be trained in any manner, such as by supervised or unsupervised learning, or by backpropagation, or in any other manner. Once the machine learning model 175 has been trained to recognize dominant characteristics of an input of a training set, e.g., to associate a pixel or set of pixels within an image with a label of a ground surface, one or more images of ground surfaces may be provided to the trained machine learning model 175, and labels of the ground surfaces may be identified based on outputs received from the machine learning model 175. In some implementations, the machine learning model 175 may be the same machine learning model that was used to derive the visual features 185-$i$-1, 185-$i$-2, 185-$i$-3, 185-$i$-4 shown in FIG. 1A. Alternatively, the machine learning model 175 may be a different machine learning model than the machine learning model that was used to derive the visual features 185-$i$-1, 185-$i$-2, 185-$i$-3, 185-$i$-4.

The query features 165-1, 165-2, 165-3, 165-4 generated based on outputs received from the machine learning model 175 in response to inputs including the images 155-1, 155-2, 155-3, 155-4 may include a vector or another set or representation of features having the same dimension K as the features 185-$i$-1, 185-$i$-2, 185-$i$-3, 185-$i$-4 of each of the map points 182-N shown in FIG. 1A, or any other dimension. Additionally, in some implementations, outputs received from the machine learning model 175 may be processed according to a principal component analysis or any other technique to derive the query features 165-1, 165-2, 165-3, 165-4.

Figure 1G:
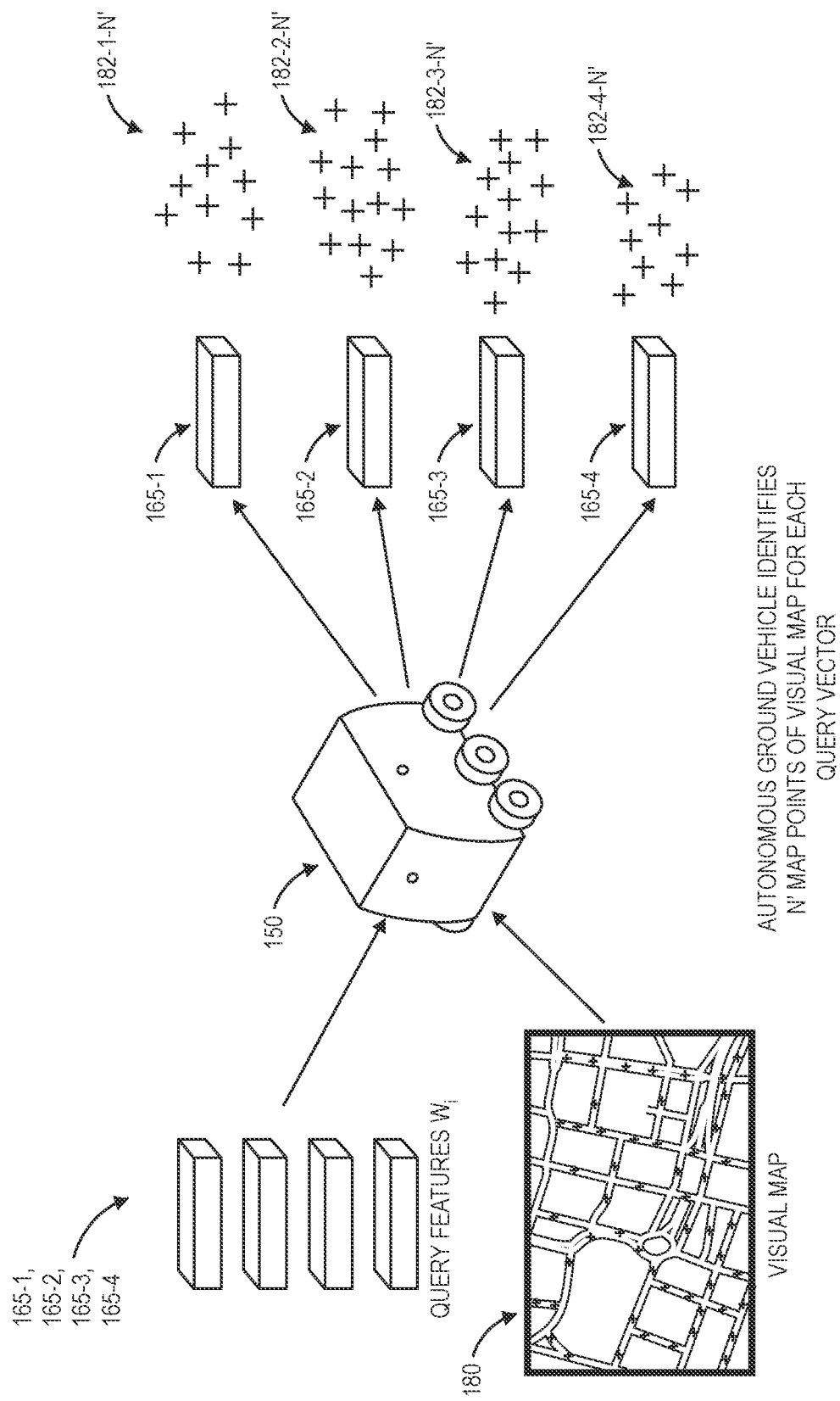

As is shown in FIG. 1G, the autonomous ground vehicle 150 may compare the query features 165-1, 165-2, 165-3, 165-4 to the visual map 180 and the visual features of the map points 182-N represented therein, and identify the predetermined number N' of the map points 182-N of the visual map 180 having visual features that are most similar to each of the query features 165-1, 165-2, 165-3, 165-4. For example, in some implementations, Euclidean distances may be calculated between each of the query features 165-1, 165-2, 165-3, 165-4 and each of the features of the map points 182-N. As is also shown in FIG. 1G, a set of map points 182-1-N' is identified as most similar to the query features 165-1, based on the Euclidean distances, while a set of map points 182-2-N' is identified as most similar to the query features 165-2, a set of map points 182-3-N' is identified as most similar to the query features 165-3, and a set of map points 182-4-N' is identified as most similar to the query features 165-4, based on the Euclidean distances.

The predetermined number N' may be any number, and may be significantly fewer than the number of map points 182-N in the visual map 180. For example, in some implementations, the visual map 180 may include hundreds of thousands of map points, each including visual features determined from images captured at such points. Likewise, the predetermined number N' of the map points 182-N may be many orders smaller than the number n, e.g., approximately one hundred map points.

Figure 1H:
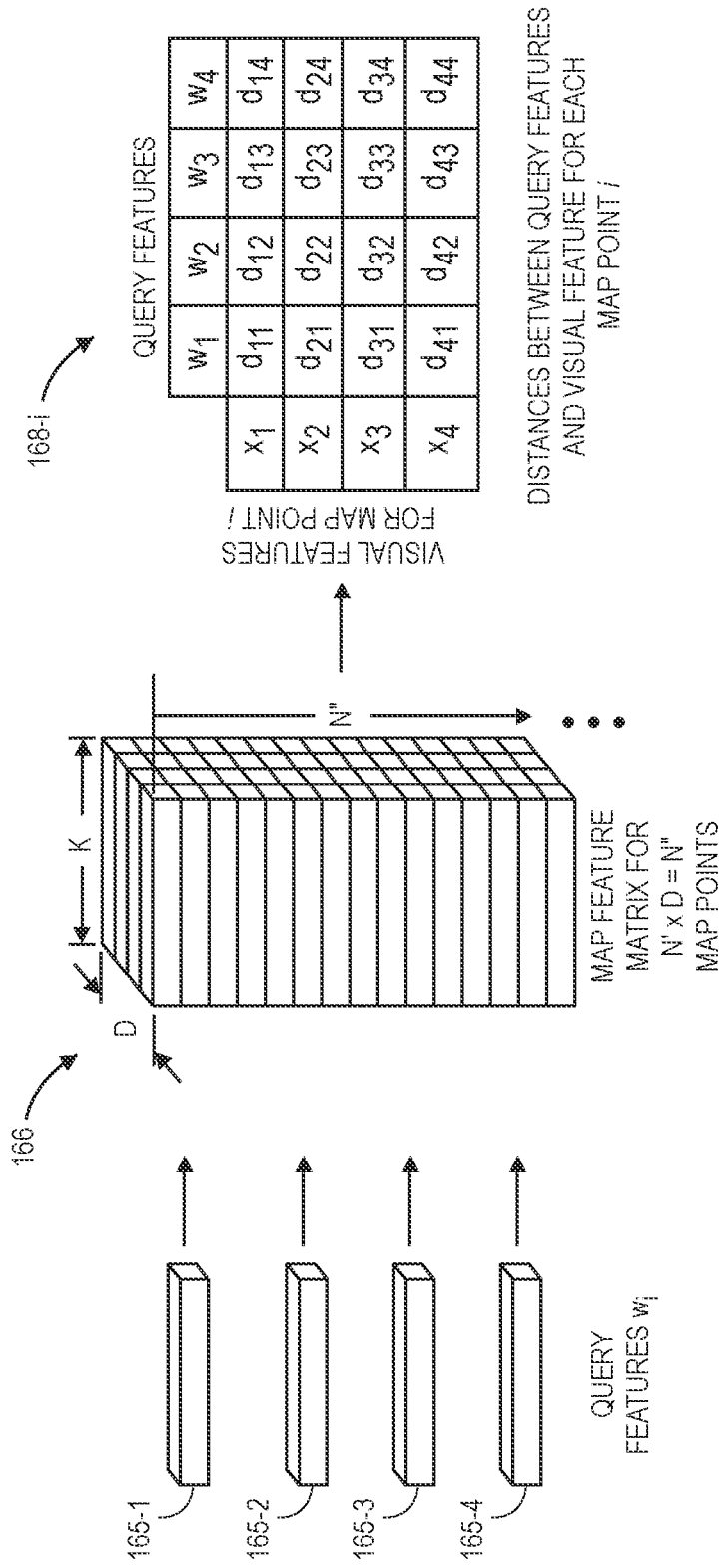

Thus, as is shown in FIG. 1H, a total of N" map points, where N" equals a product of the number D of query features 165-1, 165-2, 165-3, 165-4, viz., four, and the predetermined number N' of map points identified for each of the query features 165-1, 165-2, 165-3, 165-4, or N"=D·N'.

In some implementations, a position of the autonomous ground vehicle 150 may be determined based on any of the N" map points of the sets 182-1-N', 182-2-N', 182-3-N', 182-4-N'. For example, the position of the autonomous ground vehicle 150 may be a position of one of the N'" map points selected at random, or based on a position associated with a cluster of one or more of the N" map points. Alternatively, the position of the autonomous ground vehicle 150 may be quantitatively determined based on similarities between the query features 165-1, 165-2, 165-3, 165-4 and the respective visual features of the N" map points.

As is shown in FIG. 1H, the query features 165-1, 165-2, 165-3, 165-4 may be compared to each of the visual features of the N" map points of the sets 182-1-N', 182-2-N', 182-3-N', 182-4-N', to identify one of the N" map points that most closely corresponds to the position of the autonomous ground vehicle 150, based on distances between the query features 165-1, 165-2, 165-3, 165-4 and the visual features of the N" map points. For example, in some implementations, a map feature matrix 166 may be constructed from the visual features of the N" map points, and processed to calculate distances between each of the query features 165-1, 165-2, 165-3, 165-4 and each of the visual features of each of the N" map points. The map feature matrix 166 may have dimensions defined by the number D, the dimension K of the visual features, and the number N" of the map points.

As is further shown in FIG. 1H, based on the map feature matrix 166, a set 168-$i$ of distances may be calculated between visual features of each map point i of the N" map points and each of the D query features 165-1, 165-2, 165-3, 165-4. For example, distances $d_{11}, d_{12}, d_{13}, d_{14}$ (e.g., Euclidean distances) between a first visual feature of the map point i, or $x_1$, and each of the D query features 165-1, 165-2, 165-3, 165-4, or $w_1, w_2, w_3, w_4$ are calculated. Likewise, distances $d_{21}, d_{22}, d_{23}, d_{24}$ between a second visual feature of the map point i, or $x_2$, and each of the D query features 165-1, 165-2, 165-3, 165-4 are calculated, while distances $d_{31}, d_{32}, d_{33}, d_{34}$ between a third visual feature of the map point i, or $x_3$, and each of the D query features 165-1, 165-2, 165-3, 165-4 are calculated, and distances $d_{41}, d_{42}, d_{43}, d_{44}$ between a fourth visual feature of the map point i, or $x_4$, and each of the D query features 165-1, 165-2, 165-3, 165-4 are calculated.

Figure 1I:
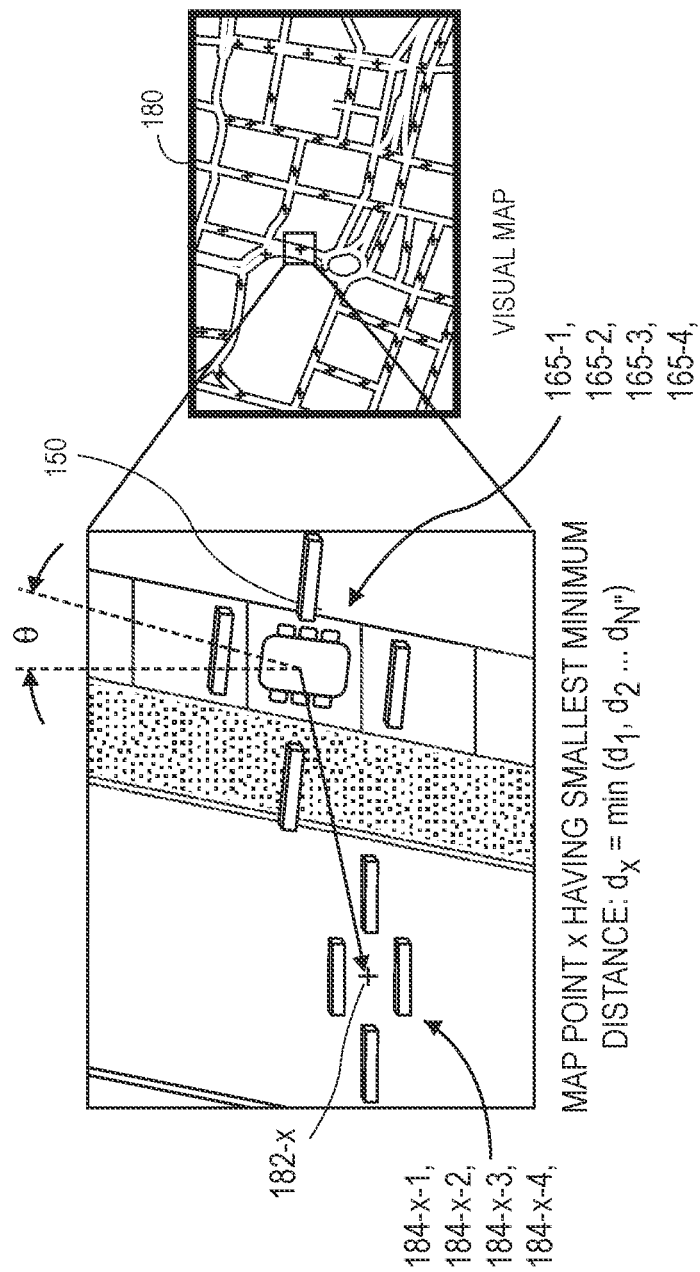

As is shown in FIG. 1I, sums of the minimum distances between visual features of each map point i of the N" map points and each of the D query features 165-1, 165-2, 165-3, 165-4 are determined based on the set 168-$i$ calculated for each of the N" map points. For example, for each map point i, a minimum distance $d_i$ is calculated as a sum of the minimum value of the distances $d_{11}, d_{12}, d_{13}, d_{14}$ between the first visual feature $x_1$ of the map point i and each of the D query features 165-1, 165-2, 165-3, 165-4, the minimum value of the distances $d_{21}, d_{22}, d_{23}, d_{24}$ between the second visual feature $x_2$ of the map point i and each of the D query features 165-1, 165-2, 165-3, 165-4, the minimum value of the distances $d_{31}, d_{32}, d_{33}, d_{34}$ between the third visual feature $x_3$ of the map point i and each of the D query features 165-1, 165-2, 165-3, 165-4 and the minimum value of the distances $d_{41}, d_{42}, d_{43}, d_{44}$ between the fourth visual feature $x_4$ of the map point i and each of the D query features 165-1, 165-2, 165-3, 165-4. As a result, a set of sums of minimum distances for the N" map points, or $d_1, d_2 \ldots d_{N'''}$, is calculated.

As is further shown in FIG. 1I, a position of the autonomous ground vehicle 150 may be predicted or determined to be a position of a map point 182-$x$, viz., one of the N" map points having the smallest sum of the set of minimum distances for the N" map points, or $d_1, d_2 \ldots d_{N'''}$, or $d_x$.

Additionally, a heading θ or an orientation of the autonomous ground vehicle 150 may be determined based on a comparison of one or more of the features 185-$x$-1, 185-$x$-2, 185-$x$-3, 185-$x$-4 of the map point 182-$x$ to one or more of the query features 165-1, 165-2, 165-3, 165-4 determined from the images 155-1, 155-2, 155-3, 155-4 captured by the autonomous ground vehicle 150. For example, where one of the query features 165-1, 165-2, 165-3, 165-4 is determined to be most similar to one of the features 185-$x$-1, 185-$x$-2, 185-$x$-3, 185-$x$-4 of the map point 182-$x$, the heading θ of the autonomous ground vehicle 150 may be estimated based on a location or an orientation corresponding to the one of the features 185-$x$-1, 185-$x$-2, 185-$x$-3, 185-$x$-4 with respect to the map point 182-$x$, e.g., an axis of orientation of a camera that captured an image from which the one of the features 185-$x$-1, 185-$x$-2, 185-$x$-3, 185-$x$-4 was derived. Alternatively, the heading θ of the autonomous ground vehicle 150 may be determined based on similarities of two or more of the features 185-$x$-1, 185-$x$-2, 185-$x$-3, 185-$x$-4 of the map point 182-$x$ to two or more of the query features 165-1, 165-2, 165-3, 165-4 determined by the autonomous ground vehicle 150.

In some implementations, a predetermined number of the map points 182-$n$ may be identified based on the distances between their respective features and the query features 165-1, 165-2, 165-3, 165-4. Features determined from such map points and the query features 165-1, 165-2, 165-3, 165-4 may be provided to a direction classifier that is trained to determine whether query features determined from images are consistent with features of a map point, such that an orientation of a vehicle that captured the images from which the query features were determined is consistent with an orientation of a vehicle that captured the images at the map point from which the features were determined. A direction of the autonomous ground vehicle with respect to the map point may be determined based on outputs received from the direction classifier in response to such inputs. Moreover, a trained direction classifier may also be used to confirm or increase a level of confidence in a map point selected based on the query features 165-1, 165-2, 165-3, 165-4. For example, where an output received from the direction classifier is sufficiently low, e.g., below a threshold value, or at a minimum value, the map point may be determined to be an inappropriate or incorrect selection, or to not correspond to the position of the autonomous ground vehicle 150.

The safe operation of an autonomous ground vehicle depends on an accurate determination of a position of the vehicle, which is typically determined using an inertial measurement unit, or a component that is installed within or mounted to the autonomous ground vehicle and is configured to detect changes in linear or rotational motion of the autonomous ground vehicle, e.g., by one or more gyroscopes, accelerometers, magnetometers, or other sensors provided therein. For example, an inertial measurement unit may be configured to detect changes in linear and/or angular motion along the one or more principal axes of the autonomous ground vehicle, e.g., the normal axis (or yaw axis), the lateral axis (or pitch axis), or the longitudinal axis (or roll axis) of the autonomous ground vehicle. The gyroscopes (or other rotation sensing units), the accelerometers (or other acceleration sensing units) and the magnetometers (e.g., compasses or other magnetism sensing units) of an inertial measurement unit may be configured to determine angular velocities, accelerations and magnetic fields, respectively, either as individual sensing structures or as component parts of a common unit, e.g., a three-axis gyroscope or a three-axis accelerometer. In response to sensed angular velocities, accelerations or magnetic fields, the inertial measurement unit may return one or more signals representing aspects of an orientation of the autonomous ground vehicle, and such signals may be utilized for any purpose, including but not limited to initiating or controlling the operation of one or more propulsion motors, control surfaces or other systems.

An autonomous ground vehicle may further include one or more systems or components for determining a position of the autonomous ground vehicle, e.g., a latitude and a longitude corresponding to a ground-based position of the autonomous ground vehicle, or a latitude, a longitude and an elevation of a position of the autonomous ground vehicle in three-dimensional space. For example, the autonomous ground vehicle may include a locating module that obtains a geocode or other data regarding a location of the autonomous ground vehicle at an associated level of accuracy or tolerance, including but not limited to one or more GPS sensors, microchips or other components that determine locations by interpreting signals received from one or more GPS satellites. Such components typically operate by measuring the transit times of GPS signals received from multiple satellites, which generally travel at the speed of light, and determining distances to the respective satellites based on the transit times. Using three or more such signals, an approximate position of a computer device may be determined to within a defined degree or level of accuracy. Other positioning systems, such as the Galileo GNSS System operated by the European Space Agency, or the BeiDou Navigation Satellite System operated by China, also rely on satellites to provide position data to ground-based receivers.

The autonomous ground vehicles of the present disclosure may be vehicles having any number of wheels mounted to axles that may be rotated by one or more motors, with dimensions, masses or other indicators of size that may be selected on any basis. For example, in some implementations, the autonomous ground vehicles may be sized and configured to travel on roads, sidewalks, crosswalks, bicycle paths, trails or the like, as well as yards, parking lots, driveways, patios or other surfaces, at various times or during various levels of congestion, and at various speeds, e.g., in response to one or more computer-based instructions.

Additionally, autonomous ground vehicles of the present disclosure may include a cargo bay or other storage compartment, or multiple cargo bays or storage compartments, for maintaining items therein at any desired temperature, pressure or alignment or orientation, and to protect such items against the elements. Furthermore, in some implementations, the autonomous ground vehicles may include various equipment or components for determining whether a cargo bay or other storage compartment is empty or includes one or more items, or for identifying specific items that are stored therein, along with equipment or components for engaging or interacting with such items. The autonomous ground vehicles may also include one or more display screens (e.g., touchscreen displays, scanners, keypads) having one or more user interfaces for displaying information regarding such vehicles or their contents to humans, or for receiving interactions (e.g., instructions) from such humans, or other input/output devices for such purposes.

Moreover, the autonomous ground vehicles of the present disclosure may include any number of sensors such as position sensors (e.g., GPS receivers, or cellular transceivers configured to triangulate positions based on signals received from multiple cellular transmitters), imaging sensors (e.g., digital cameras or other imaging devices) or other sensors, including but not limited to speedometers, inclinometers, compasses, altimeters, gyroscopes or scanners. The autonomous ground vehicles of the present disclosure may also include communications equipment (e.g., wired or wireless means for communication such as components or systems operating Wireless Fidelity, Bluetooth, near-field communications or cellular technologies or protocols), along with one or more power modules (e.g., batteries), which may be rechargeable, refuelable or replaceable in nature. Information or data obtained or determined by such sensors or such communications equipment may be utilized in manually or automatically controlling an autonomous ground vehicle, e.g., in causing the autonomous ground vehicle to travel along one or more paths or routes, to search for alternate paths or routes, or to avoid expected or unexpected hazards encountered by the autonomous ground vehicle while traveling along such paths or routes. The autonomous ground vehicles of the present disclosure may further include any number of computer components (e.g., processors, data stores, transceivers or input/output devices) for performing any of the tasks or executing any of the functions described herein.

In still other implementations, autonomous ground vehicles may be programmed or otherwise configured to automatically access one or more predetermined or specified locations, e.g., to automatically deliver an item to a given location or to retrieve items from the given location. For example, an autonomous ground vehicle may be programmed or instructed to automatically open a door or other entry point at a facility (e.g., a private dwelling or business location), to access a public garage or other parking or standing area, or to activate an indicator within a home, an office or another structure. An autonomous ground vehicle may be configured to transmit wireless codes, signals or other information to trigger a response from one or more devices or machines equipped with wireless transceivers, such as garage door openers, doorbells, lights, haptic feedback systems or other machines or devices. Alternatively, requests or instructions for granting access to locations on behalf of an autonomous ground vehicle may be transmitted by one or more external computer devices or resources to one or more devices associated with structures at the locations, and access to such locations may be granted accordingly. Such requests or instructions may include access codes, authenticators, keys, tokens or similar information, which may be used by an autonomous ground vehicle to obtain access to one or more structures at a given location.

The autonomous ground vehicles of the present disclosure may be configured for travel on any type or form of surfaces associated with a transportation infrastructure network. In some implementations, the autonomous ground vehicle may be particularly configured for travel on sidewalks or other limited access passageways that are generally designed for travel by humans or other animals on foot, or by lightweight vehicles such as strollers or bicycles. For example, in some implementations, sidewalks or like passageways traveled upon by autonomous ground vehicles of the present disclosure may include residential sidewalks, commercial sidewalks, or any other type or form of sidewalks, which may be formed from any material, including but not limited to asphalt, bituminous pavement, bricks, cement, cobblestone, composite materials, concrete, dirt, grass, gravel, pavers, or any other materials.

Additionally, sidewalks may include various frontage zones or buffer zones and may be defined or established with respect to neighboring parcels (e.g., front yards, buildings, parking lots) by curbs, fences, walls, or other natural or artificial barriers of any type or form. Additionally, such sidewalks may include or be positioned near lights (e.g., street lights), furniture (e.g., benches, chairs, tables or planters), parking facilities (e.g., parking spaces and/or meters), shelters for passengers awaiting livery vehicles, buses or trains, as well as commercial vehicles such as trucks, vans or carts. Sidewalks may also include aprons, ramps, stairs, warning strips, or other facilities. Sidewalks may have any appropriate shapes or dimensions (e.g., widths, lengths, thicknesses), and may be flat or aligned at any angle or pitch, which may be selected on any basis or factor relating to anticipated travel thereon during use.

Those of ordinary skill in the pertinent arts will recognize that the autonomous ground vehicles of the present disclosure are not limited to traveling on sidewalks, however.

Figure 2A:
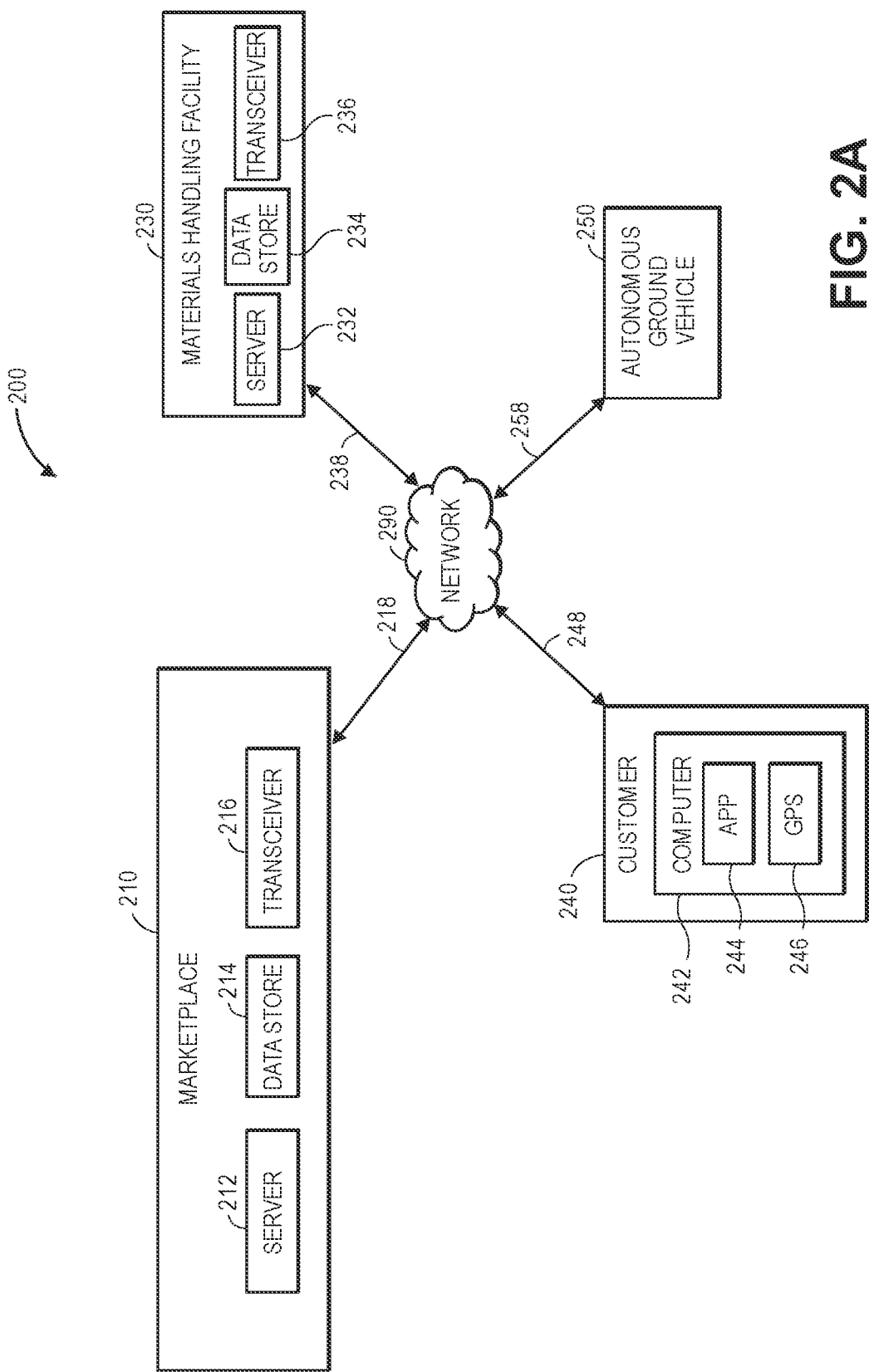
FIGS. 2A and 2B are block diagrams of components of one system for visual localization of autonomous ground vehicles in accordance with implementations of the present disclosure.
Figure 2B:
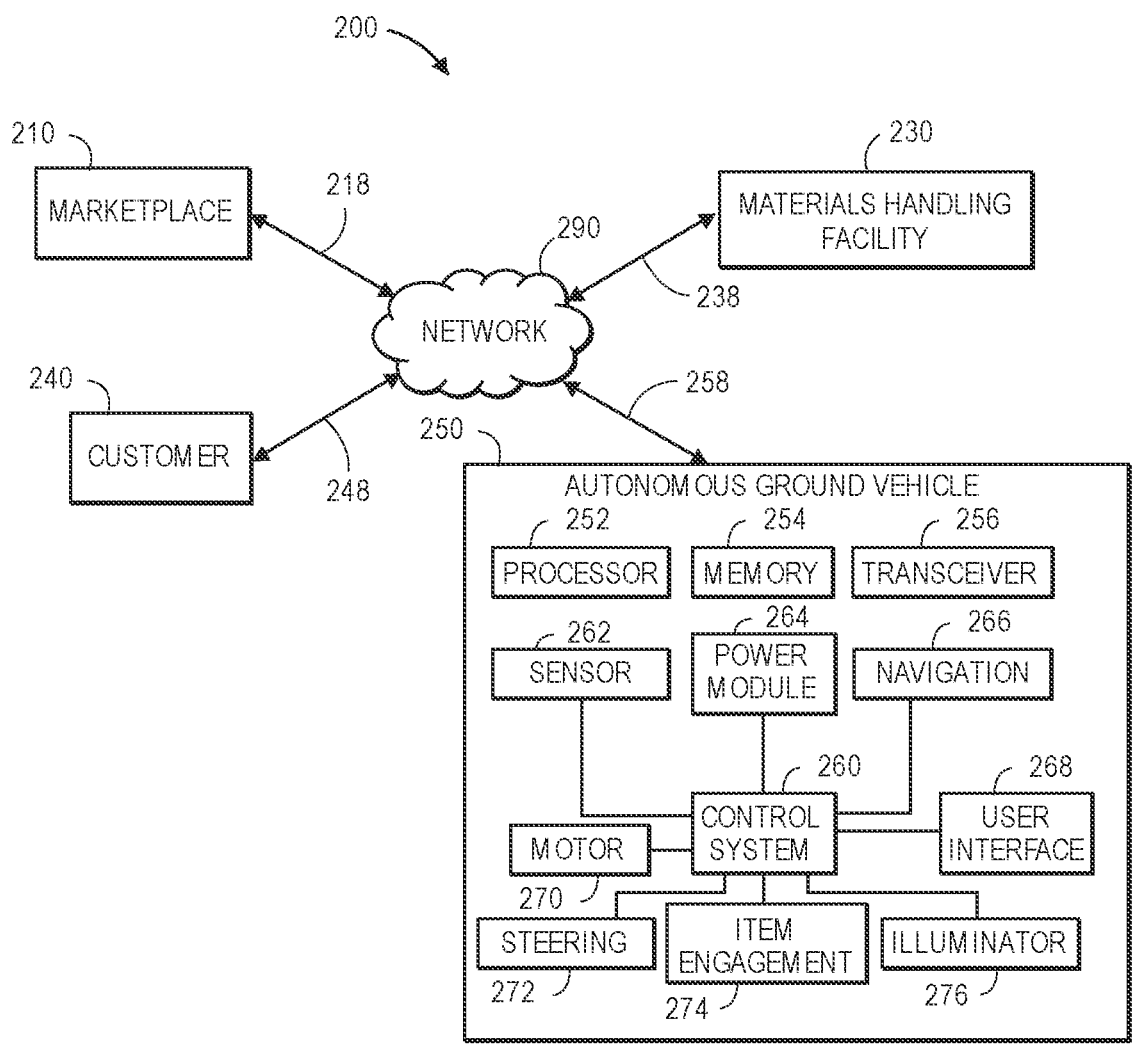

Referring to FIGS. 2A and 2B, a block diagram of components of one system 200 for visual localization of autonomous ground vehicles in accordance with implementations of the present disclosure is shown. The system 200 includes a marketplace (e.g., an online marketplace, or an electronic marketplace) 210, a materials handling facility 230, a customer 240 and an autonomous ground vehicle 250 that are connected to one another across a network 290, which may include the Internet in whole or in part. Except where otherwise noted, reference numerals preceded by the number "2" in FIG. 2A or FIG. 2B refer to elements that are similar to elements having reference numerals preceded by the number "1" shown in FIGS. 1A through 1I.

The marketplace 210 may be any entity or individual that wishes to make items (which may include goods, products, services or information of any type or form) from a variety of sources (e.g., vendors, manufacturers, merchants or sellers) available for download, purchase, rent, lease or borrowing by customers using a networked computer infrastructure, including one or more physical computer servers 212 and data stores 214 (e.g., databases) for hosting one or more network sites and one or more transceivers 216 or other communications systems.

The marketplace 210 may be physically or virtually associated with one or more storage or distribution facilities, such as the materials handling facility 230, and may implement the one or more network sites using the one or more servers 212, e.g., by connecting or otherwise communicating with the one or more data stores 214 as well as the network 290, through the sending and receiving of digital data as indicated by line 218. Moreover, the data stores 214 may include any type of information regarding items that have been made available for sale through the marketplace 210, or ordered by customers, such as the customer 240, from the marketplace 210, or any information or data regarding the delivery of such items to the customers. The data stores 214 may include any information or data regarding customers and items that the customers prefer or disfavor, including but not limited to histories of searching or browsing for information or data regarding such items, e.g., by way of one or more network sites maintained by the marketplace 210, or histories of purchasing such items or considering such items for purchase.

The server 212 may be a uniprocessor system including one processor, or a multiprocessor system including several processors (e.g., two, four, eight, or another suitable number), and may be capable of executing instructions. For example, in some implementations, the server 212 may be a general-purpose or embedded processor unit such as a CPU or a GPU having any number of instruction set architectures (or "ISA"), such as the x86, PowerPC, SPARC, or MIPS ISAs, or any other suitable ISA. Where the server 212 is a multiprocessor system, each of the processors within the multiprocessor system may operate the same ISA, or different ISAs.

Additionally, the data stores 214 may be implemented using any suitable memory technology, such as randomaccess memory (or "RAM"), static RAM (or "SRAM"), synchronous dynamic RAM (or "SDRAM"), nonvolatile/Flash-type memory, or any other type of memory. The transceiver 216 may be configured to enable the marketplace 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the marketplace 210, or to one or more other computer devices or systems (e.g., the autonomous ground vehicle 250 or one or more other vehicles, not shown) via the network 290. The transceiver 216 may perform any necessary protocol, timing or other data transformations in order to convert data signals from a first format suitable for use by one component into a second format suitable for use by another component. In some implementations, the transceiver 216 may include support for devices attached through various types of peripheral buses, e.g., variants of the Peripheral Component Interconnect (PCI) bus standard or the Universal Serial Bus (USB) standard. In some other implementations, functions of the transceiver 216 may be split into two or more separate components, or integrated with the server 212.

The materials handling facility 230 may be any facility that is adapted to receive, store, process and/or distribute items. As is shown in FIG. 2A, the materials handling facility 230 includes a server 232, a data store 234, and a transceiver 236. The materials handling facility 230 also includes stations for receiving, storing and distributing items to customers.

The server 232 and/or the data store 234 may operate one or more order processing and/or communication systems and/or software applications having one or more user interfaces, or communicate with one or more other computing devices or machines that may be connected to the network 290, as indicated by line 238, for transmitting or receiving information in the form of digital or analog data, or for any other purpose. For example, the server 232 and/or the data store 234 may also operate or provide access to one or more reporting systems for receiving or displaying information or data regarding orders for items received by the marketplace 210, and may provide one or more interfaces for receiving interactions (e.g., text, numeric entries or selections) from one or more operators, users, workers or other persons in response to such information or data. The server 232, the data store 234 and/or the transceiver 236 may be components of a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding workflow operations, or the interactions received from the one or more operators, users, workers or persons.

For example, the server 232 and/or the data store 234 may be configured to determine an optimal path or route between two locations for the execution of a given mission or task to be executed by the autonomous ground vehicle 250, or by any other vehicle (not shown), such as according to one or more traditional shortest path or shortest route algorithms such as Dijkstra's Algorithm, Bellman-Ford Algorithm, Floyd-Warshall Algorithm, Johnson's Algorithm or a hub labeling technique. Additionally, the server 232 and/or the data store 234 may be configured to control or direct, or to recommend or suggest, collaboration between or among the customer 240 and/or one or more of the autonomous ground vehicles 250, or any other vehicles, in the performance of one or more tasks or in the execution of one or more functions. For example, the server 232 and/or the data store 234 may identify appropriate locations or rendezvous points where one or more humans, vehicles or other machines, e.g., the customer 240 and/or one or more of the autonomous ground vehicles 250, may meet in order to transfer inventory or materials therebetween, or for any other purpose.

The transceiver 236 may be configured to enable the materials handling facility 230 to communicate through one or more wired or wireless means, e.g., wired technologies such as Universal Serial Bus (or "USB") or fiber optic cable, or standard wireless protocols such as Bluetooth® or any Wi-Fi protocol, such as over the network 290 or directly. The transceiver 236 may include one or more of the properties or features of the transceiver 216 described herein, or any other properties or features.

The materials handling facility 230 may further include one or more control systems that may generate instructions for conducting operations at one or more receiving stations, storage areas and/or distribution stations. Such control systems may be associated with the server 232, the data store 234 and/or the transceiver 236, or with one or more other computing devices or machines, and may communicate by any known wired or wireless means, or with the marketplace 210, the customer 240 or the autonomous ground vehicle 250 over the network 290, as indicated by line 238, through the sending and receiving of digital data.

Additionally, the materials handling facility 230 may include one or more systems or devices (not shown in FIG. 2A or FIG. 2B) for locating or identifying one or more elements therein, such as cameras or other image recording devices. Furthermore, the materials handling facility 230 may also include one or more workers or staff members (not shown in FIG. 2A or FIG. 2B), who may handle or transport items within the materials handling facility 230. Such workers may operate one or more computing devices or machines for registering the receipt, retrieval, transportation or storage of items within the materials handling facility 230, or a general-purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 240 may be any entity or individual that wishes to download, purchase, rent, lease, borrow or otherwise obtain items (which may include goods, products, services or information of any type or form) from the marketplace 210 or the materials handling facility 230, e.g., for delivery to a selected destination, or by any other means. The customer 240 may utilize one or more computing devices 242 (e.g., a smartphone, a tablet computer, a laptop computer, a desktop computer, a smart speaker, or computing devices provided in wristwatches, televisions, set-top boxes, automobiles or any other appliances or machines), or any other like machine, that may operate or access one or more software applications 244, such as a web browser or a shopping application, or a position sensor ("GPS") 246, and may be connected to or otherwise communicate with the marketplace 210, the materials handling facility 230 or the autonomous ground vehicle 250 through the network 290, as indicated by line 248, by the transmission and receipt of digital data. The position sensor 246 may be any device, component, system or instrument adapted to receive signals (e.g., trilateration data or information) relating to a position of the computing device 242, from one or more GPS satellites of a GPS network, or, alternatively, from one or more towers or beacons from a cellular telephone network, or from any other source (not shown).

The autonomous ground vehicle 250 may be any type or form of self-powered vehicle capable of being programmed or otherwise configured for autonomous travel between two points along one or more paths or routes, in the performance of one or more missions or tasks, based on one or more computer instructions. For example, one or more of the autonomous ground vehicles 250 may be configured to determine an optimal path or route between two locations for the execution of a given mission or task on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. Such optimal paths or routes may, in some implementations, include one or more common locations or rendezvous points where an item or materials may be transferred between or among the autonomous ground vehicle 250, or one or more humans, machines or other vehicles.

As is shown in FIG. 2B, the autonomous ground vehicle 250 may include one or more computer components such as a processor 252, a memory 254 and a transceiver 256 in communication with one or more other computer devices that may be connected to the network 290, as indicated by line 258, in order to transmit or receive information in the form of digital or analog data, or for any other purpose. For example, the autonomous ground vehicle 250 may receive instructions or other information or data via the transceiver 256 regarding an item that is to be delivered by the autonomous ground vehicle 250 from the materials handling facility 230 to the customer 240, e.g., from the servers 212, 232 and/or the computing device 242, or from any other computing devices over the network 290. The transceiver 256 may be configured to enable the autonomous ground vehicle 250 to communicate through one or more wired or wireless means, e.g., wired technologies such as Universal Serial Bus (or "USB") or fiber optic cable, or standard wireless protocols such as Bluetooth® or any Wi-Fi protocol, such as over the network 290 or directly. The transceiver 256 may include one or more of the properties or features of the transceiver 216 or the transceiver 236 described herein, or any other properties or features.

As is shown in FIG. 2B, the autonomous ground vehicle 250 also includes one or more control systems 260, as well as one or more sensors 262, one or more power modules 264, one or more navigation modules 266, and one or more user interfaces 268. Additionally, the autonomous ground vehicle 250 further includes one or more motors 270, one or more steering systems 272, one or more item engagement systems (or devices) 274 and one or more illuminators 276 (or other feedback devices).

The autonomous ground vehicle 250 may be any type or form of vehicle. For example, in some implementations, one or more of the tasks or functions described herein as being performed by an autonomous ground vehicle may be performed by a ground vehicle that is outfitted with one or more of the sensors 262 described herein and is manned or otherwise operated manually, such as a remote-controlled car. Alternatively, the autonomous ground vehicle 250 may be a hovercraft, or any other vehicle or craft configured for travel over land or water surfaces, e.g., at low altitudes.

The control system 260 may include one or more software applications or hardware components configured for controlling or monitoring operations of one or more components such as the sensor 262, the power module 264, the navigation module 266, or the user interfaces 268, as well as the motors 270, the steering systems 272, the item engagement systems 274 and the illuminators 276, e.g., by receiving, generating, storing and/or transmitting one or more computer instructions to such components. The control system 260 may communicate with the marketplace 210, the materials handling facility 230 and/or the customer 240 over the network 290, as indicated by line 258, through the sending and receiving of digital data.

The sensor 262 may be a position sensor such as a GPS receiver in communication with one or more orbiting satellites or other components of a GPS system, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data), of the autonomous ground vehicle 250. Geolocations of the sensor 262 may be associated with the autonomous ground vehicle 250, where appropriate.

The sensor 262 may also be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the autonomous ground vehicle 250, or for any other purpose. For example, the sensor 262 may be configured to capture or detect reflected light if the reflected light is within a field of view of the sensor 262, which is defined as a function of a distance between an imaging sensor and a lens within the sensor 262, viz., a focal length, as well as a position of the sensor 262 and an angular orientation of the lens. Accordingly, where an object appears within a depth of field, or a distance within the field of view where the clarity and focus is sufficiently sharp, the sensor 262 may capture light that is reflected off objects of any kind to a sufficiently high degree of resolution using one or more sensors thereof, and store information regarding the reflected light in one or more data files.

The sensor 262 may also include manual or automatic features for modifying a field of view or orientation. For example, the sensor 262 may be a digital camera configured in a fixed position, or with a fixed focal length (e.g., fixed-focus lenses) or angular orientation. Alternatively, the sensor 262 may include one or more actuated or motorized features for adjusting a position of the sensor 262, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 262, or a change in one or more of the angles defining the angular orientation of the sensor 262.

For example, the sensor 262 may be an imaging device that is hard-mounted to a support or mounting that maintains the imaging device in a fixed configuration or angle with respect to one, two or three axes. Alternatively, however, the sensor 262 may be provided with one or more motors and/or controllers for manually or automatically operating one or more of the components, or for reorienting the axis or direction of the sensor 262, i.e., by panning or tilting the sensor 262. Panning the sensor 262 may cause a rotation within a horizontal plane or about a vertical axis (e.g., a yaw), while tilting the sensor 262 may cause a rotation within a vertical plane or about a horizontal axis (e.g., a pitch). Additionally, the sensor 262 may be rolled, or rotated about its axis of rotation, and within a plane that is perpendicular to the axis of rotation and substantially parallel to a field of view of the sensor 262.

Imaging data (e.g., still or moving images, as well as associated audio data or metadata) captured using the sensor 262 may be processed according to any number of recognition techniques. In some implementations, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, or does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 262 may further be or include one or more compasses, speedometers, altimeters, inclinometers, thermometers, barometers, hygrometers, gyroscopes, air monitoring sensors (e.g., oxygen, ozone, hydrogen, carbon monoxide or carbon dioxide sensors), ozone monitors, pH sensors, moisture sensors, magnetic anomaly detectors, metal detectors, radiation sensors (e.g., Geiger counters, neutron detectors, alpha detectors), accelerometers, ranging sensors (e.g., radar, sonar or LIDAR ranging sensors) or sound sensors (e.g., microphones, piezoelectric sensors, vibration sensors or other transducers for detecting and recording acoustic energy from one or more directions).

The sensor 262 may be further configured to capture, record and/or analyze information or data regarding its positions, velocities, accelerations or orientations of the autonomous ground vehicle 250, and to analyze such data or information by one or more means, e.g., by aggregating or summing such data or information to form one or more qualitative or quantitative metrics of the movement of the sensor 262. For example, a net vector indicative of any and all relevant movements of the autonomous ground vehicle 250, including but not limited to physical positions, velocities, accelerations or orientations of the sensor 262, may be derived. Additionally, coefficients or scalars indicative of the relative movements of the autonomous ground vehicle 250 may also be defined.

Although the sensor 262 is shown as intrinsic to or onboard the autonomous ground vehicle 250, the autonomous ground vehicle 250 may utilize one or more sensors that are external to the autonomous ground vehicle 250 in the capture of information or data, or rely on information or data captured using such sensors, in accordance with the present disclosure. For example, the autonomous ground vehicle 250 may receive information or data regarding ground conditions at a location that was captured by one or more sensors at the location. Such external sensors may have any or all of the features or characteristics of the sensors 262 disclosed herein.

The power module 264 may be any type of power source for providing electrical power, mechanical power or other forms of power in support of one or more electrical or mechanical loads aboard the autonomous ground vehicle 250. In some implementations, the power module 264 may include one or more batteries or other power cells, e.g., dry cell or wet cell batteries such as lead-acid batteries, lithium-ion batteries, nickel cadmium batteries or nickel metal hydride batteries, or any other type, size or form of batteries. The power module 264 may each have any cell voltages, peak load currents, charge times, specific energies, internal resistances or cycle lives, or other power ratings. The power module 264 may also be any type, size or form of other power source, e.g., other than a battery, including but not limited to, one or more fuel cells, turbines, solar cells or others. Alternatively, the power module 264 may be another form of prime mover (e.g., electric, gasoline-powered or any other type of motor) capable of generating sufficient mechanical forces for the autonomous ground vehicle 250.

The navigation module 266 may include one or more software applications or hardware components including or having access to information or data regarding aspects of transportation systems within a given region or space, including the locations, dimensions, capacities, conditions, statuses or other attributes of various paths or routes in the region or space. For example, the navigation module 266 may receive inputs from the sensor 262, e.g., from a GPS receiver, an imaging device or another sensor, and determine an optimal direction and/or an optimal speed of the autonomous ground vehicle 250 for travelling on a given path or route based on such inputs. The navigation module 266 may select a path or route to be traveled upon by the autonomous ground vehicle 250, and may provide information or data regarding the selected path or route to the control system 260.

The user interface 268 may be configured to receive and provide information to human users and may include, but is not limited to, a display, (e.g., a touch-screen display), a scanner, a keypad, a biometric scanner, an audio transducer, one or more speakers, one or more imaging devices such as a video camera, and any other types of input or output devices that may support interaction between the autonomous ground vehicle 250 and a human user. In various implementations, the user interface 268 may include a variety of different features. For example, in one implementation, the user interface 268 may include a relatively small display and/or a keypad for receiving inputs from human users. In other implementations, inputs for controlling the operation of the autonomous ground vehicle 250 may be provided remotely. For example, in order to access a storage compartment, a human user may send a text message to or reply to a text message from the control system 260 and request that a door or other access portal be opened in order to enable the user to access an item therein. In various implementations, the autonomous ground vehicle 250 may have capabilities for directly receiving such signals from a user device or other device (e.g., a device inside a user's residence) that provides a signal to open the storage compartment door.

The motor 270 may be any type or form of motor or engine (e.g., electric, gasoline-powered or any other type of motor) that is capable of providing sufficient rotational forces to one or more axles, shafts and/or wheels for causing the autonomous ground vehicle 250 and any items therein to travel in a desired direction and at a desired speed. In some implementations, the autonomous ground vehicle 250 may include one or more electric motors having any number of stators, poles and/or windings, such as an outrunner or an inrunner brushless direct current (DC) motor, or any other motors, having any speed rating, power rating or any other rating.

The steering system 272 may be any system for controlling a direction of travel of the autonomous ground vehicle 250. The steering system 272 may include any number of automatically operable gears (e.g., racks and pinions), gear boxes, shafts, shaft assemblies, joints, servos, hydraulic cylinders, linkages or other features for repositioning one or more wheels to cause the autonomous ground vehicle 250 to travel in a desired direction.

The item engagement system 274 may be any mechanical component, e.g., a robotic arm, for engaging an item or for disengaging the item, as desired. For example, when the autonomous ground vehicle 250 is tasked with delivering items or materials from an origin to a destination, the item engagement system 274 may be used to engage the items or materials at the origin and to deposit the items or materials in a cargo bay or other storage compartment prior to departing. After the autonomous ground vehicle 250 arrives at the destination, the item engagement system 274 may be used to retrieve the items or materials within the cargo bay or storage compartment, and deposit the items or materials in a desired location at the destination.

In some implementations, the autonomous ground vehicle 250 may be programmed or configured to perform one or more missions or tasks in an integrated manner. For example, the control system 260 may be programmed to instruct the autonomous ground vehicle 250 to travel to an origin, e.g., the materials handling facility 230, and to begin the performance of a task there, such as by retrieving an item at the origin using the item engagement system 274, before proceeding to a destination, e.g., the customer 240, along a selected route (e.g., an optimal route). Along the way, the control system 260 may cause the motor 270 to operate at any predetermined speed and cause the steering system 272 to orient the autonomous ground vehicle 250 in a predetermined direction or otherwise as necessary to travel along the selected route, e.g., based on information or data received from or stored in the navigation module 266. The control system 260 may further cause the sensor 262 to capture information or data (including but not limited to imaging data) regarding the autonomous ground vehicle 250 and/or its surroundings along the selected route. The control system 260 or one or more other components of the autonomous ground vehicle 250 may be programmed or configured as necessary in order to execute any actions associated with a given task, in accordance with the present disclosure.

The illuminator 276 may be any light or light source that is configured to project light in one or more directions. For example, in some implementations, the illuminator 276 may be one or more light-emitting diodes (or "LED"), liquid crystal displays (or "LCD"), incandescent bulbs, compact and/or linear fluorescent bulbs, halogen lamps, metal halide lamps, neon lamps, sodium lamps or any other type or form of lights configured to project light at any frequency, wavelength or intensity. Alternatively, or in addition to the illuminator 276, the autonomous ground vehicle 250 may include one or more other feedback devices, including but not limited to components such as audio speakers or other physical components that may be automatically controlled or configured to generate audible messages, signals or sounds, or one or more haptic vibrating elements that may be automatically controlled or configured to generate tactile vibrations of any frequency or intensity.

Any combination of networks or communications protocols may be utilized in accordance with the systems and methods of the present disclosure. For example, each of the autonomous ground vehicles 250 may be configured to communicate with one another or with the servers 212, 232 and/or the computing device 242 via the network 290, such as is shown in FIGS. 2A and 2B, e.g., via an open or standard protocol such as Wi-Fi. Alternatively, each of the autonomous ground vehicles 250 may be configured to communicate with one another directly outside of a centralized network, such as the network 290, e.g., by a wireless protocol such as Bluetooth, in which two or more of the autonomous ground vehicles 250 may be paired with one another.

Moreover, in some implementations, two or more of the autonomous ground vehicles 250 may be configured to collaborate with one another in the performance of one or more tasks. For example, in some implementations, imaging data captured using sensors 262 provided aboard a first autonomous ground vehicle 250 may be processed to generate a visual map for use by a second autonomous ground vehicle 250. In some implementations, the second autonomous ground vehicle 250 may rely upon the visual map generated by the first autonomous ground vehicle 250 exclusively, or may augment or update the visual map based on imaging data captured by sensors 262 provided aboard the second autonomous ground vehicle 250, or from any other source. Furthermore, two or more autonomous ground vehicles 250 may collaborate with one another in the performance of one or more tasks, such as by transferring one or more ordered items therebetween, or in any other manner.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "materials handling facility," a "customer," an "autonomous ground vehicle" (or "autonomous vehicle"), or like terms, may be automated steps performed by their respective computer systems, or implemented within software modules (or computer programs) executed by one or more general-purpose computers. Moreover, process steps described as being performed by a "marketplace," a "materials handling facility," a "customer," or an "autonomous ground vehicle" may be typically performed by a human operator, but could, alternatively, be performed by an automated agent. Moreover, as used herein, the term "materials handling facility" may include, but is not limited to, warehouses, distribution centers, cross-docking facilities, fulfillment centers, packaging facilities, shipping facilities, rental facilities, libraries, retail stores or establishments, wholesale stores, museums, or other facilities or combinations of facilities for performing one or more functions of material or inventory handling for any purpose.

The marketplace 210, the materials handling facility 230, the customer 240, or the autonomous ground vehicle 250 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, marketplace messages, telephone calls or the like. For example, the materials handling facility 230 and/or the server 232 may be adapted to transmit information or data in the form of synchronous or asynchronous messages to the marketplace 210 and/or the server 212, the customer 240 and/or the computing device 242, the autonomous ground vehicle 250 and/or the control system 260, or any other computer device in real time or in near-real time, or in one or more offline processes, via the network 290. Those of ordinary skill in the pertinent art would recognize that the marketplace 210, the materials handling facility 230, the customer 240, or the autonomous ground vehicle 250 may operate any of a number of computing devices that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 232, the computing device 242, the processors 252 or any other computers or control systems utilized by the marketplace 210, the materials handling facility 230, the customer 240, or the autonomous ground vehicle 250, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
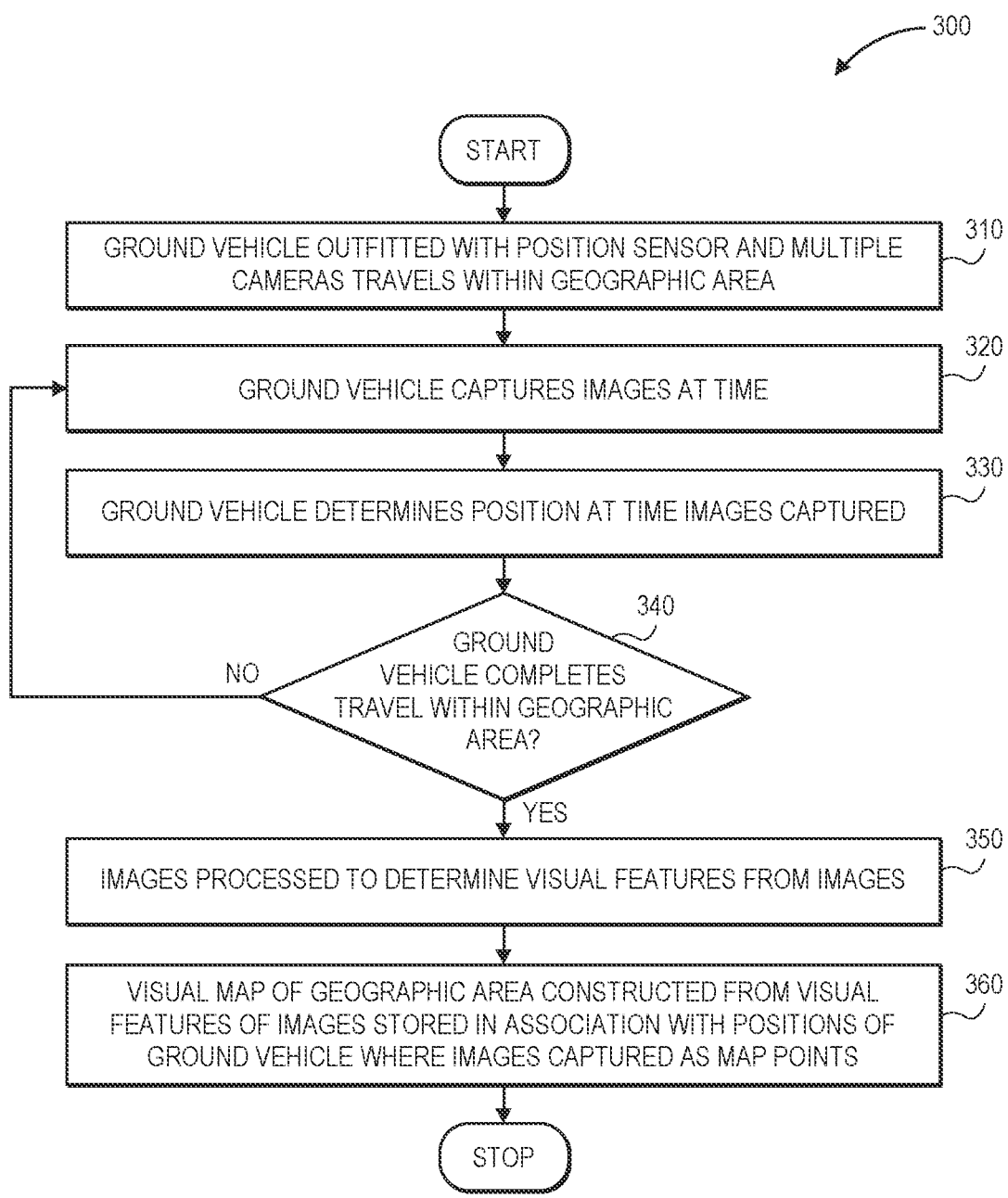
FIG. 3 is a flow chart of one process for visual localization of autonomous ground vehicles in accordance with implementations of the present disclosure.

Referring to FIG. 3, a flow chart 300 of one process for visual localization of autonomous ground vehicles in accordance with implementations of the present disclosure is shown. At box 310, a ground vehicle outfitted with a position sensor (e.g., a GPS sensor) and multiple cameras travels within a geographic area. In some implementations, the ground vehicle may be an autonomous ground vehicle, a human-operated ground vehicle, a semi-autonomous ground vehicle, or any other system that is configured to travel on one or more surfaces within the geographic area. The cameras may be aligned with fields of view extending forward or aft of the ground vehicle, from port and starboard sides of the ground vehicle, or in any other direction with respect to the ground vehicle, e.g., at the same angles with respect to the longitudinal axis, or at different angles. The imaging devices may be configured to capture color, grayscale or black-and-white images, or any other images (e.g., depth images), in accordance with the present disclosure.

The geographic area may be any defined or undefined space including ground surfaces formed from any materials, such as gravel, pavement, cement, concrete, dirt, grass, or others, as well as any buildings (e.g., homes or other dwellings, offices, retail establishments, schools, or others), structures (e.g., bridges, fences, walls, or others), plant life (e.g., trees, bushes, plants, or others). The ground vehicle may be configured to travel upon roads, sidewalks, crosswalks, bicycle paths, walking paths, bridges or trails, or any other surfaces.

At box 320, the ground vehicle captures images at a time using the cameras. The ground vehicle may travel through the geographic area along a predetermined course or at a predetermined speed, and capture images at regular intervals of time or distance, e.g., every several meters or every several seconds. The course and/or the speed may be selected on any basis, including but not limited to power available to the autonomous ground vehicle, operational capacities or constraints of the autonomous ground vehicle, topography of a region of the geographic area, prevailing weather or surface conditions within the region, or any other relevant factor.

At box 330, the ground vehicle determines a position at the time that the images were captured at box 320, e.g., using one or more onboard position sensors. The ground vehicle may further store each of the images captured at the time in association with the position of the ground vehicle, e.g., georeferenced or otherwise synchronized with the position at the time. Alternatively, or additionally, the ground vehicle may store the images in association with one or more identifiers of an orientation of the ground vehicle or of one or more of the cameras at the time.

At box 340, whether the ground vehicle has completed its travels throughout the geographic area is determined. If the ground vehicle has not completed its travels, then the process returns to box 320, where the ground vehicle captures images at a next time, and to box 330, where the ground vehicle determines a position of the ground vehicle at that next time.

If the ground vehicle has completed its travels throughout the geographic area, or has otherwise concluded capturing images, then the process advances to box 350, where the images are processed to determine visual features of such images. In some implementations, the images may be provided as inputs to a machine learning model, such as one or more artificial neural networks (e.g., convolutional neural networks). The machine learning model may be trained to map pixels of images to desired outputs by adjusting strengths of connections between one or more neurons, e.g., synaptic weights, and may have any number of layers, such as an input layer, an output layer, and any number of intervening hidden layers. In some implementations, each of the images may be preprocessed, e.g., resized or otherwise processed, prior to processing the images at box 350. Furthermore, in some implementations, the images captured at box 340 may be provided to a principal component analysis method, e.g., to identify or extract significant aspects of the visual features determined from such images, or to reduce the dimensionality of the visual features.

At box 360, a visual map of the geographic area is constructed from the visual features of the images stored in association with the positions of the ground vehicle where the images were captured as map points, and the process ends. The visual features determined from each of the images captured at each map point may have any number, value or form. For example, where the ground vehicle includes M cameras for capturing images at a point, and each of the visual features determined from each of the images is a vector having a dimension K, the visual map may be represented in a multidimensional matrix X having dimensions of N×M×K.

The visual map of the geographic area may be programmed into any autonomous ground vehicle prior to instructing the autonomous ground vehicle to execute one or more missions within the geographic area.

Figure 4B:
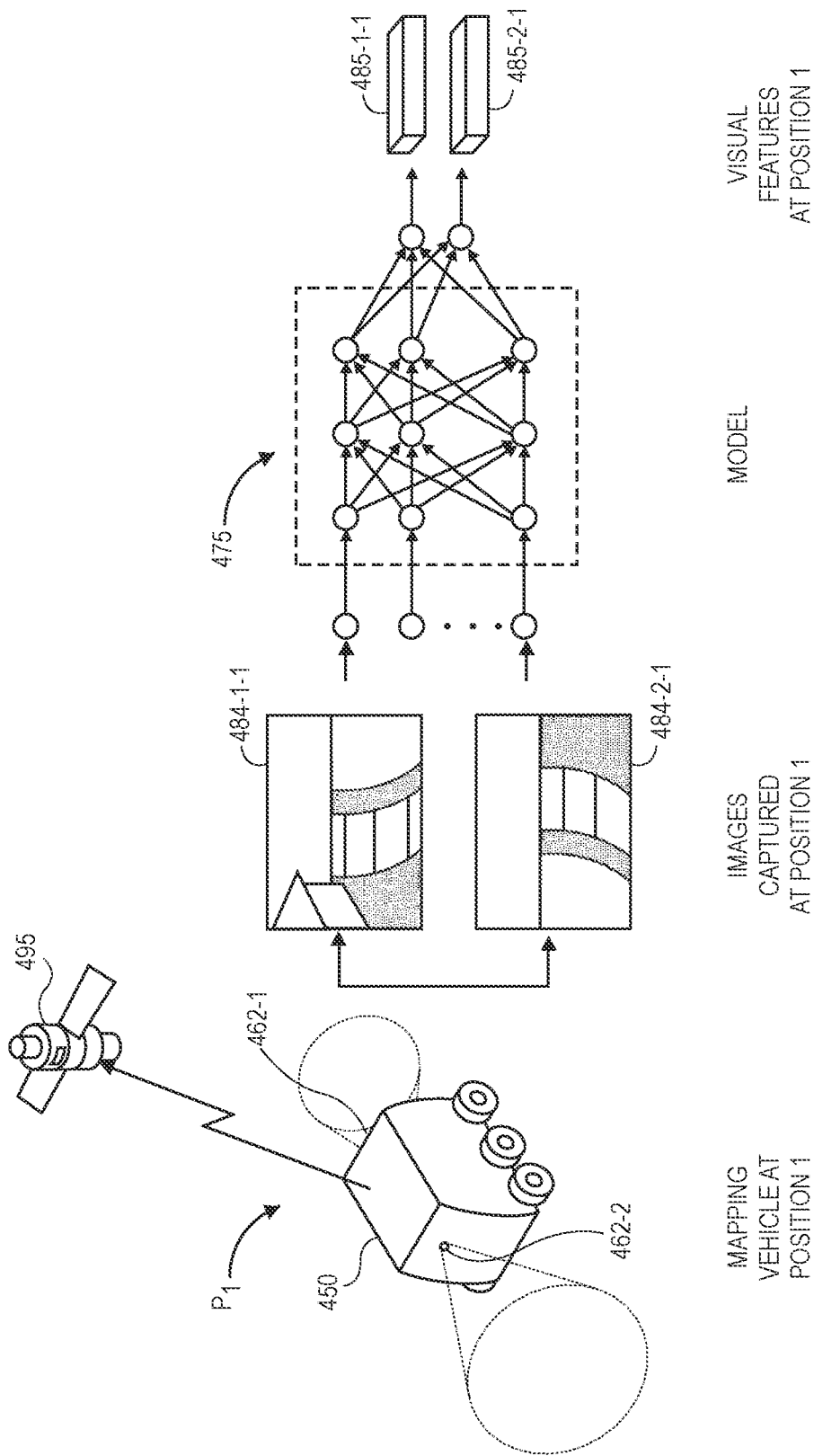
Figure 4C:
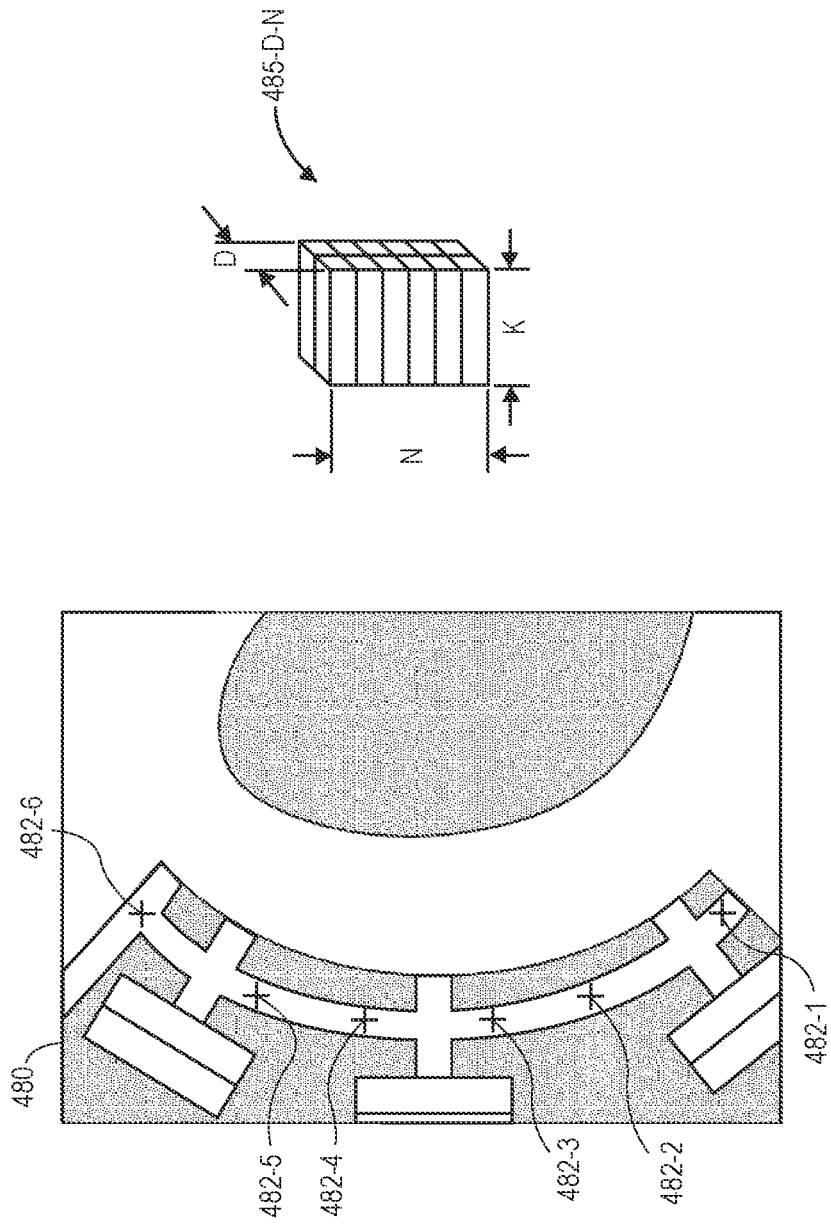

Referring to FIGS. 4A through 4C, views of aspects of one system for visual localization of autonomous ground vehicles in accordance with implementations of the present disclosure are shown. Except where otherwise noted, reference numerals preceded by the number "4" in FIGS. 4A through 4C to elements that are similar to elements having reference numerals preceded by the number "2" in FIG. 2A or FIG. 2B or by the number "1" shown in FIGS. 1A through 1I.

As is shown in FIG. 4A, a mapping vehicle 450 (e.g., an autonomous ground vehicle, or any other vehicle) outfitted with a pair of cameras 462-1, 462-2 travels through a geographic area on one or more roads, sidewalks, crosswalks, bicycle paths, walking paths, bridges or trails. One of the cameras 462-1, 462-2 is aligned with a field of view extending forward of the mapping vehicle 450, while another of the cameras 462-1, 462-2 is aligned with a field of view extending aft of the mapping vehicle 450. In some implementations, the fields of view of the cameras 462-1, 462-2 may extend from the mapping vehicle 450 in any other direction or orientation. Alternatively, the mapping vehicle 450 may include any number of other cameras (not shown) having fields of view extending in any direction or orientation.

As is further shown in FIG. 4A, the mapping vehicle 450 may travel along one or more surfaces, on a predetermined course or at a predetermined speed, which may be selected on any basis, e.g., available power, operational capabilities, topography of the geographic area, weather or surface conditions, or any other factors. The course and/or the speed may be selected on any basis, including but not limited to power available to the autonomous ground vehicle, operational capacities or constraints of the autonomous ground vehicle, topography of a region of the geographic area, prevailing weather or surface conditions within the region, or any other relevant factor. The cameras 462-1, 462-2 may capture images with the mapping vehicle 450 at a variety of points in three-dimensional space, viz., positions $P_1$, $P_2$, $P_3$, $P_4$, $P_5$, $P_6$, which may be separated by regular intervals of distance, e.g., several meters.

For example, as is shown in FIG. 4B, the mapping vehicle 450 captures a pair of images 484-1-1, 484-2-1, simultaneously or substantially simultaneously with the mapping vehicle 450 at the position $P_1$. Each of the images 484-1-1, 484-2-1 depicts objects of any type or form that are present within the forward field of view of the camera 462-1 or the aft field of view of the camera 462-2, respectively. As is further shown in FIG. 4B, the mapping vehicle 450 may provide the images 484-1-1, 484-2-1, as inputs to a machine learning model 475 (e.g., an artificial neural network, such as convolutional neural network) executed by one or more processor units provided aboard the mapping vehicle 450. The machine learning model 475 may have any number of neurons provided in an input layer, any number of hidden or intervening layers, and an output layer. Such neurons may receive inputs and generate outputs in accordance with an activation function or an energy function, according to strengths or synaptic weights of connections between such neurons. Alternatively, the machine learning model 475 may have any other construction.

Based on outputs received from the machine learning model 475 in response to inputs including the images 484-1-1, 484-2-1, respectively, the mapping vehicle 450 generates a pair of visual features 485-1-1, 485-2-1, including a vector or another representation of the image 484-1-1 and a vector or another representation of the image 484-2-1.

Additionally, as is also shown in FIG. 4B, the mapping vehicle 450 may receive information (e.g., position signals) regarding the position $P_1$ of the mapping vehicle 450 at a time that the images 484-1-1, 484-2-1 were captured, from one or more satellites 495 of a GPS network, or from any other source. Once the visual features 485-1-1, 485-2-1 have been generated and the information regarding the position $P_1$ has been determined, the visual features 485-1-1, 485-2-1 may be stored in association with a map point corresponding to the position $P_1$, e.g., in one or more data stores. The mapping vehicle 450 may then proceed to the other positions $P_2$, $P_3$, $P_4$, $P_5$, $P_6$ within the geographic area, or to any other positions, and capture and process images using the cameras 462-1, 462-2 in the same manner shown in FIG. 4B with respect to the position $P_1$, or in any other manner.

As is shown in FIG. 4C, a visual map 480 may be generated for the geographic area and may include or represent visual features 485-D-N determined from images captured at the positions $P_1$, $P_2$, $P_3$, $P_4$, $P_5$, $P_6$ and stored in association with such positions $P_1$, $P_2$, $P_3$, $P_4$, $P_5$, $P_6$ at map points 482-1, 482-2, 482-3, 482-4, 482-5, 482-6. The visual map 480 may be represented as a feature matrix or another data structure having dimensions D×N×K, where images are captured by D cameras (viz., two) of the mapping vehicle 450 at N points (viz., six) within the geographic area, and wherein each of the visual features 485-D-N determined from such images has a dimension K.

Once the visual map 480 is generated, the visual map 480 may be programmed into a memory component of one or more vehicles, e.g., autonomous ground vehicles, that are assigned, designated, configured or instructed to execute one or more missions or tasks within the geographic area.

Figure 5:
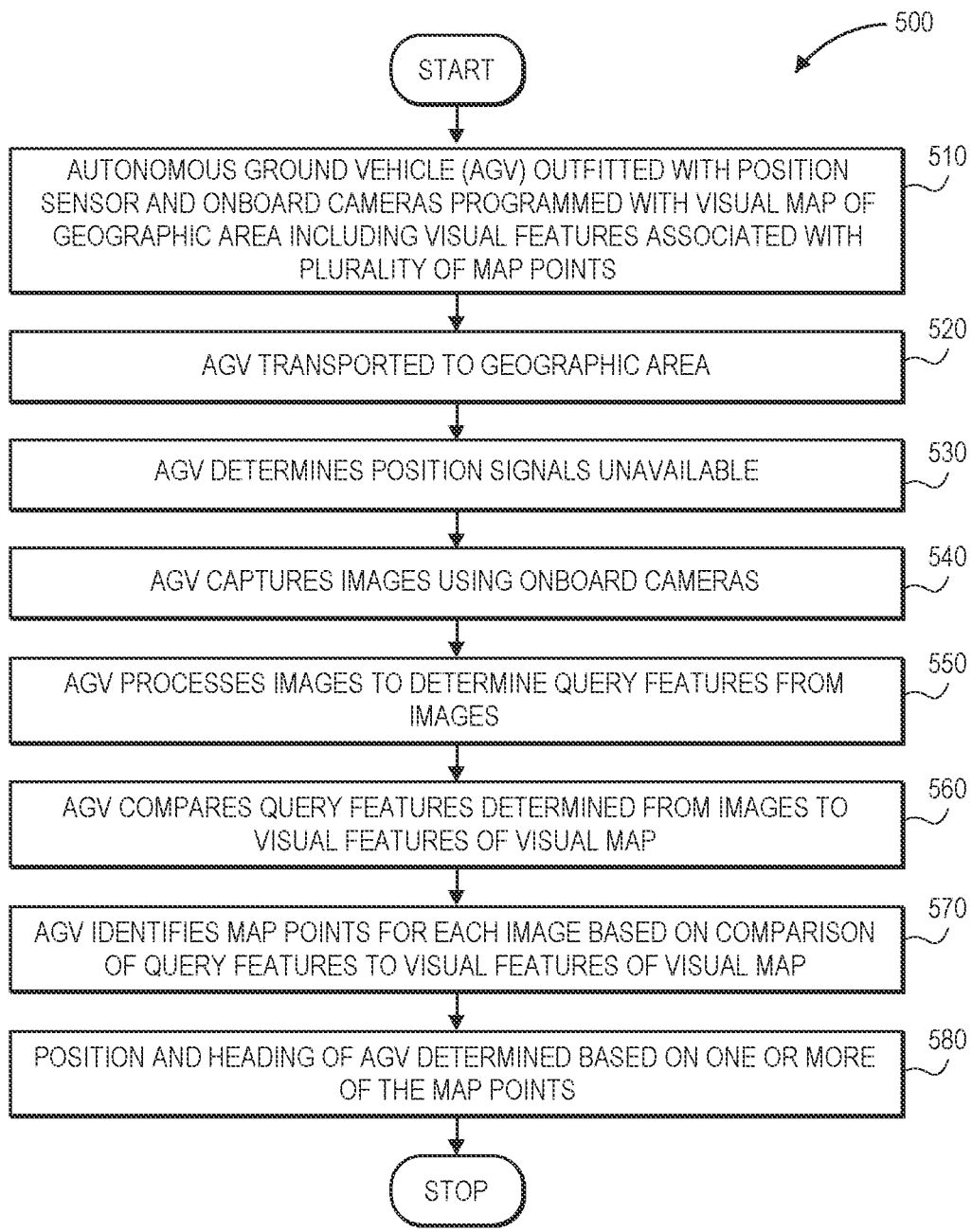
FIG. 5 is a flow chart of one process for visual localization of autonomous ground vehicles in accordance with implementations of the present disclosure.

Referring to FIG. 5, a flow chart 500 of one process for visual localization of autonomous ground vehicles in accordance with implementations of the present disclosure is shown. At box 510, an autonomous ground vehicle outfitted with a position sensor and one or more onboard cameras is programmed with a visual map of a geographic area that includes visual features associated with each of a plurality of map points. The autonomous ground vehicle may include any number of computer components, e.g., a processor, a memory component, a transceiver, or others, as well as any number of motors, sensors, or other components, within a body or frame, a housing, a chassis or another structure.

For example, the autonomous ground vehicle may be tasked with delivering an item from an origin to a destination within the geographic area, e.g., an item ordered by a customer from a marketplace, or in person at (or by telephone from) a bricks-and-mortar facility. In some implementations, the item may be loaded into an autonomous ground vehicle at a fulfillment center, a warehouse, a retail establishment, or another materials handling facility, and the autonomous ground vehicle may be programmed or instructed to travel to the destination. The autonomous ground vehicle may be tasked with delivering the item from the origin to the destination by way of any number of decision points, e.g., locations where the autonomous ground vehicle must execute changes in course or speed in response to prevailing conditions or operational requirements, or waypoints, e.g., locations through which the autonomous ground vehicle must travel, but for which changes in course or speed are not required. Alternatively, the autonomous ground vehicle may be configured to execute any number of functions within the geographic area other than delivering items to destinations therein.

The visual map may have been generated in any manner based on imaging data captured at a plurality of points, viz., map points, within the geographic area. In some implementations, the imaging data may include images captured by each of a plurality of cameras provided aboard another ground vehicle, e.g., a mapping robot or mapping vehicle, that traveled throughout the geographic area at known positions, such as positions determined by one or more GPS or other position sensors provided aboard the other ground vehicle. When capturing images for use in generating a visual map, a mapping robot or mapping vehicle may be manually operated, autonomously operated, or semi-autonomously operated, e.g., by remote controls, or in any other manner.

At box 520, the autonomous ground vehicle is transported to the geographic area. For example, in some implementations, the autonomous ground vehicle may be loaded onto a carrier vehicle (e.g., a truck, a trailer, a container ship, a cargo ship, an aerial vehicle, or any other vehicle) and transported to a location within the geographic area.

At box 530, the autonomous ground vehicle determines that one or more position signals are not available. For example, where the position sensor must perform an initialization or another procedure prior to receiving position signals and generating a reliable position, e.g., a fix, therefrom, the initialization or other procedure may fail, or the position signals may simply not be received by the position sensor for any other reason.

At box 540, the autonomous ground vehicle captures images using the one or more onboard cameras. For example, in some implementations, the autonomous ground vehicle may include one camera aligned in a forward orientation, configured to capture imaging data from portions of the geographic area in front of the autonomous ground vehicle, and another camera aligned in a rear orientation (or an aft orientation), configured to capture imaging data from portions of the geographic area behind the autonomous ground vehicle. In some other implementations, the autonomous ground vehicle may include one camera aligned in a left (or port) orientation, configured to capture imaging data from portions of the geographic area to the left (or on a port side) of the autonomous ground vehicle, and another camera aligned in a right (or starboard) orientation, configured to capture imaging data from portions of the geographic area to the right (or on a starboard side) of the autonomous ground vehicle. Alternatively, the autonomous ground vehicle may include any number of cameras, aligned in any orientations with respect to a principal axis of the autonomous ground vehicle, each configured to capture imaging data from a different perspective of the autonomous ground vehicle.

At box 550, the autonomous ground vehicle processes the images to determine query features (e.g., visual features) from each of the images. For example, in some implementations, where the autonomous ground vehicle includes q cameras, each of the q cameras may capture an image, and the q images may be provided as inputs to a machine learning model, e.g., an artificial neural network, such as a convolutional neural network, that is executed by one or more processor units provided aboard the autonomous ground vehicle and trained to extract q sets of query features $w_1 \ldots w_q$ from the q images. In some implementations, the machine learning model to which the images captured at box 540 are provided at box 550, may be the same machine learning model, or a similarly trained or configured machine learning model, that was used to generate visual features for inclusion in the visual map. Moreover, in some implementations, the images captured at box 540 may be preprocessed, e.g., resized or otherwise processed, prior to processing the images at box 550. Furthermore, in some implementations, the images captured at box 540 may be provided to a principal component analysis method, e.g., to identify or extract significant aspects of the query features determined from the images, or to reduce the dimensionality of the query features.

At box 560, the autonomous ground vehicle compares the one or more query features determined from the images at box 550 to the visual features associated with the map points of the visual map. For example, in some implementations, one or more processor units provided aboard the autonomous ground vehicle may calculate Euclidean distances between each of the visual features of the visual map and each of the query features determined at box 550. Alternatively, the query features determined from the images at box 550 and the visual features of the map points of the visual map may be compared to one another in any manner.

At box 570, the autonomous ground vehicle identifies map points for each of the images captured at box 540 based on the comparisons of the query features determined from such images to the visual features associated with the map points of the visual map at box 570. For example, one or more processor units operating aboard the autonomous ground vehicle may identify or select a predetermined number of candidate map points most closely matching visual features matching each of the images or the query features determined therefrom, and the candidate map points selected for each of such images may be aggregated into a single set. In some implementations, the predetermined number of map points selected for each of the images may be significantly smaller than the total number of map points within the visual map. For example, in some implementations, a visual map may include hundreds of thousands of map points, each having corresponding visual features determined from images captured from such points. In some other implementations, a predetermined number of map points identified based on the query features may include approximately one hundred map points for each of the images or the query features determined therefrom. Alternatively, a visual map may include any number of map points, and any number of such map points may be identified based on query features determined from images captured by an autonomous ground vehicle.

At box 580, a position and a heading of the autonomous ground vehicle are determined based on one or more of the map points, and the process ends. In some implementations, one of the map points identified at box 570 may be selected randomly or on any other basis, and the position of the autonomous ground vehicle may be determined. For example, the autonomous ground vehicle may be determined to be located within an area of uncertainty or other space corresponding to one or more of the map points identified at box 570, or a cluster of such map points. In some implementations, the map points identified at box 570 may be further processed to identify one of the map points having visual features with a smallest minimum Euclidean distance to the query features, and the map points having the smallest minimum distance may be selected as corresponding to the position of the autonomous ground vehicle. Alternatively, the position of the autonomous ground vehicle may be determined based on one or more of the map points in any other manner.

Additionally, the heading (or an orientation) of the autonomous ground vehicle may be determined in any manner. For example, in some implementations, based on the comparisons of the query features to the visual features of the visual map at box 560, one of the visual features that is most similar to a query feature determined from an image captured from a field of view extending forward of the autonomous ground vehicle may be identified, and a heading or an orientation of the autonomous ground vehicle may be determined based on a position or an orientation of the one of the visual features with respect to the map point. Alternatively, the heading or the orientation may be determined by providing the query features as inputs to a trained direction classifier, and the heading or the orientation may be determined based on an output received from the direction classifier in response to the inputs.

Once the position and the orientation of the autonomous ground vehicle has been determined based on images and the visual map, the autonomous ground vehicle may continue to travel throughout the geographic area and determine or track its position and orientation accordingly, in any manner. For example, the autonomous ground vehicle may dead reckon its position over time based on the position and orientation determined at box 580 and a course and/or speed of the autonomous ground vehicle. Alternatively, the autonomous ground vehicle may continue to capture images, and to process such images to determine features therefrom. The position and orientation of the autonomous ground vehicle over time may be determined by comparing the features of such images, e.g., query features, to visual features of the visual map, such as is described above with regard to the flow chart 500 of FIG. 5, or in any other manner.

Referring to FIGS. 6A through 6E, views of aspects of one system for visual localization of autonomous ground vehicles in accordance with implementations of the present disclosure are shown. Except where otherwise noted, reference numerals preceded by the number "6" in FIGS. 6A through 6E refer to elements that are similar to elements having reference numerals preceded by the number "4" in FIGS. 4A through 4C, by the number "2" in FIG. 2A or FIG. 2B or by the number "1" shown in FIGS. 1A through 1I.

Figure 6A:
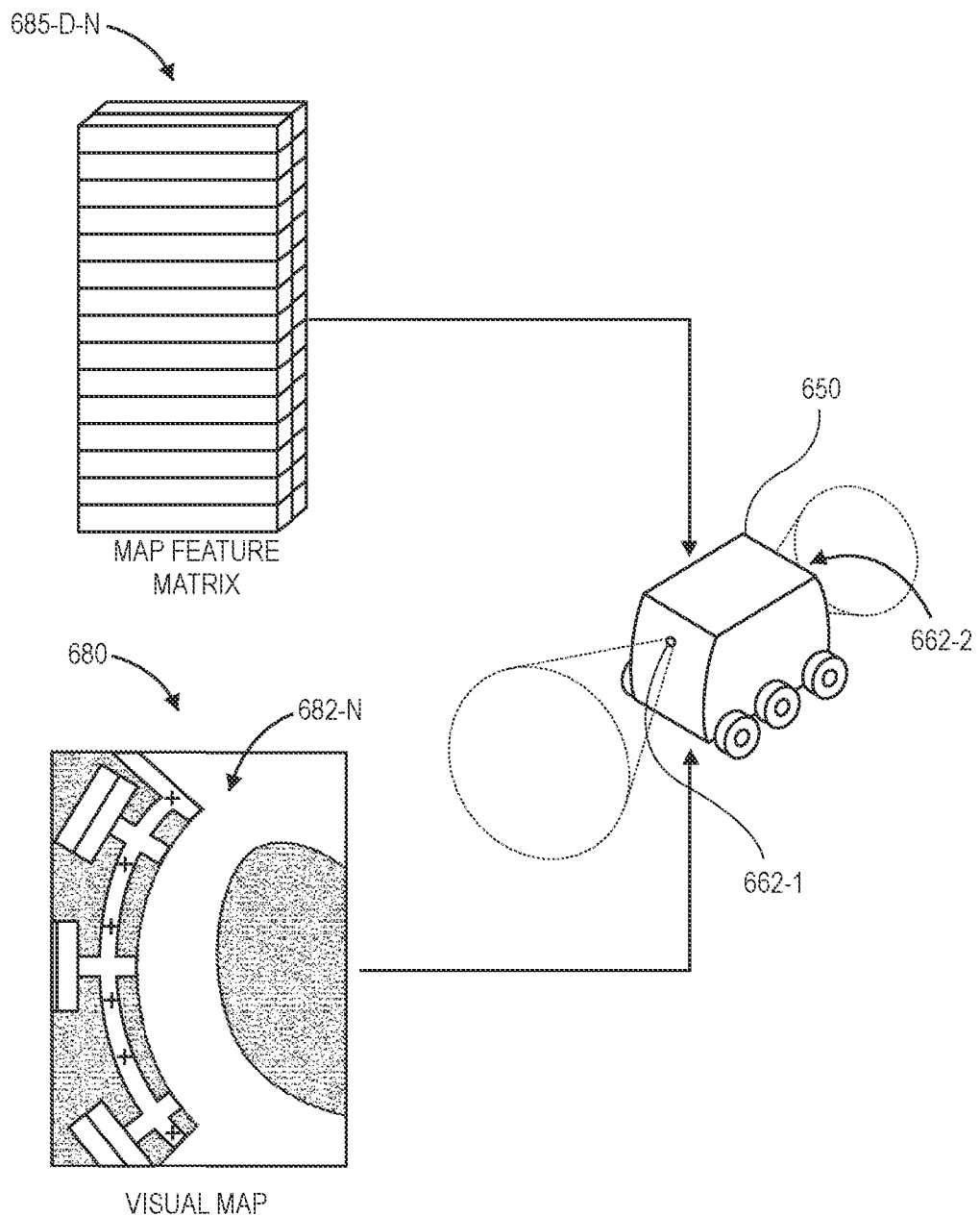
FIGS. 6A through 6E are views of aspects of one system for visual localization of autonomous ground vehicles in accordance with implementations of the present disclosure.

As is shown in FIG. 6A, an autonomous ground vehicle 650 is equipped with a pair of cameras 662-1, 662-2 pointing forward and aft with respect to an orientation or principal axes of the autonomous ground vehicle 650. Additionally, as is further shown in FIG. 6A, the autonomous ground vehicle 650 is programmed with a visual map 680 having a set of map points 682-N and a map feature matrix 685-D-N representing visual features derived from images captured at each of the map points 682-N.

Figure 6B:
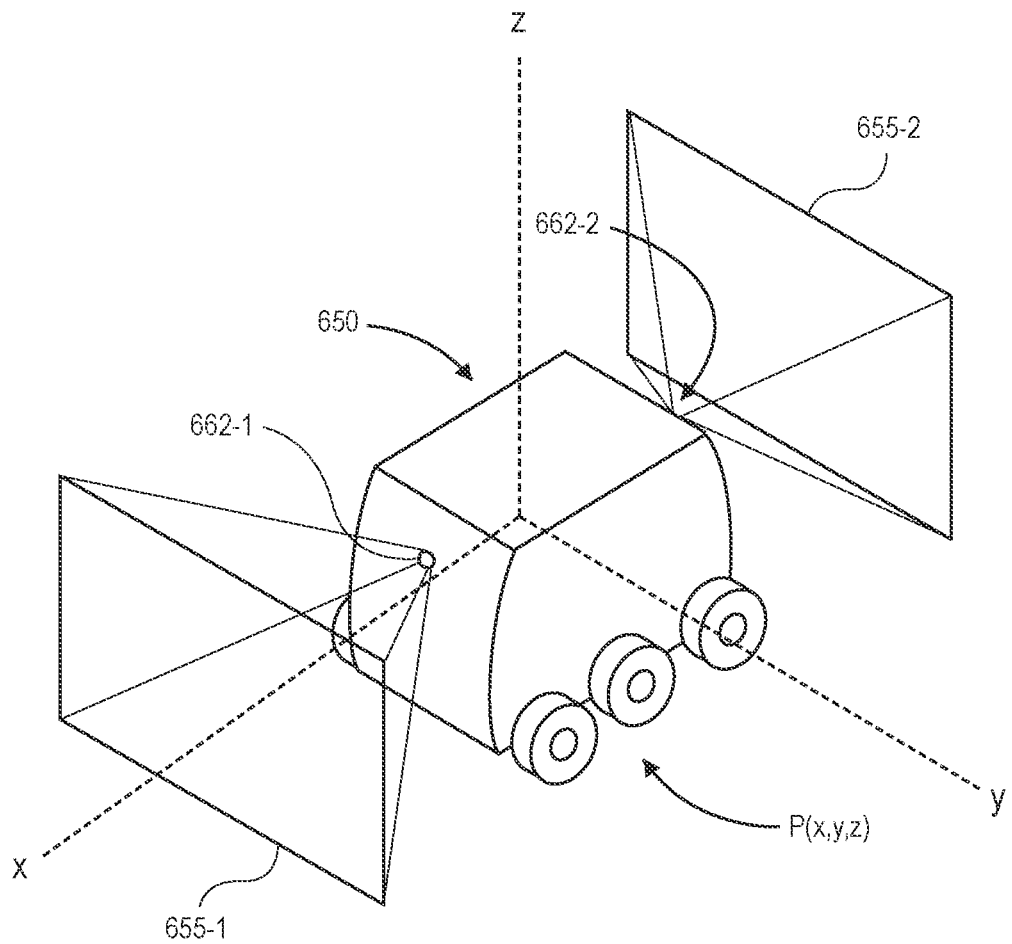

As is shown in FIG. 6B, the autonomous ground vehicle 650 captures query images 655-1, 655-2 using the cameras 662-1, 662-2, when located at a position P(x,y,z) in three-dimensional space. In some implementations, the query images 655-1, 655-2 may be captured by the cameras 662-1, 662-2 when the autonomous ground vehicle 650 determines that is unable to identify information regarding the position P(x,y,z), e.g., from one or more satellites of a GPS network, or from any other source, or that information regarding the position P(x,y,z) is unavailable or unreliable. Alternatively, the autonomous ground vehicle 650 may capture the query images 655-1, 655-2 for any other reason, such as to act as a primary source of data for determining a position of the autonomous ground vehicle 650, or a secondary source of data for determining a position of the autonomous ground vehicle 650, e.g., to augment or back up a position determined from one or more satellites of a GPS network or from any other source.

Figure 6C:
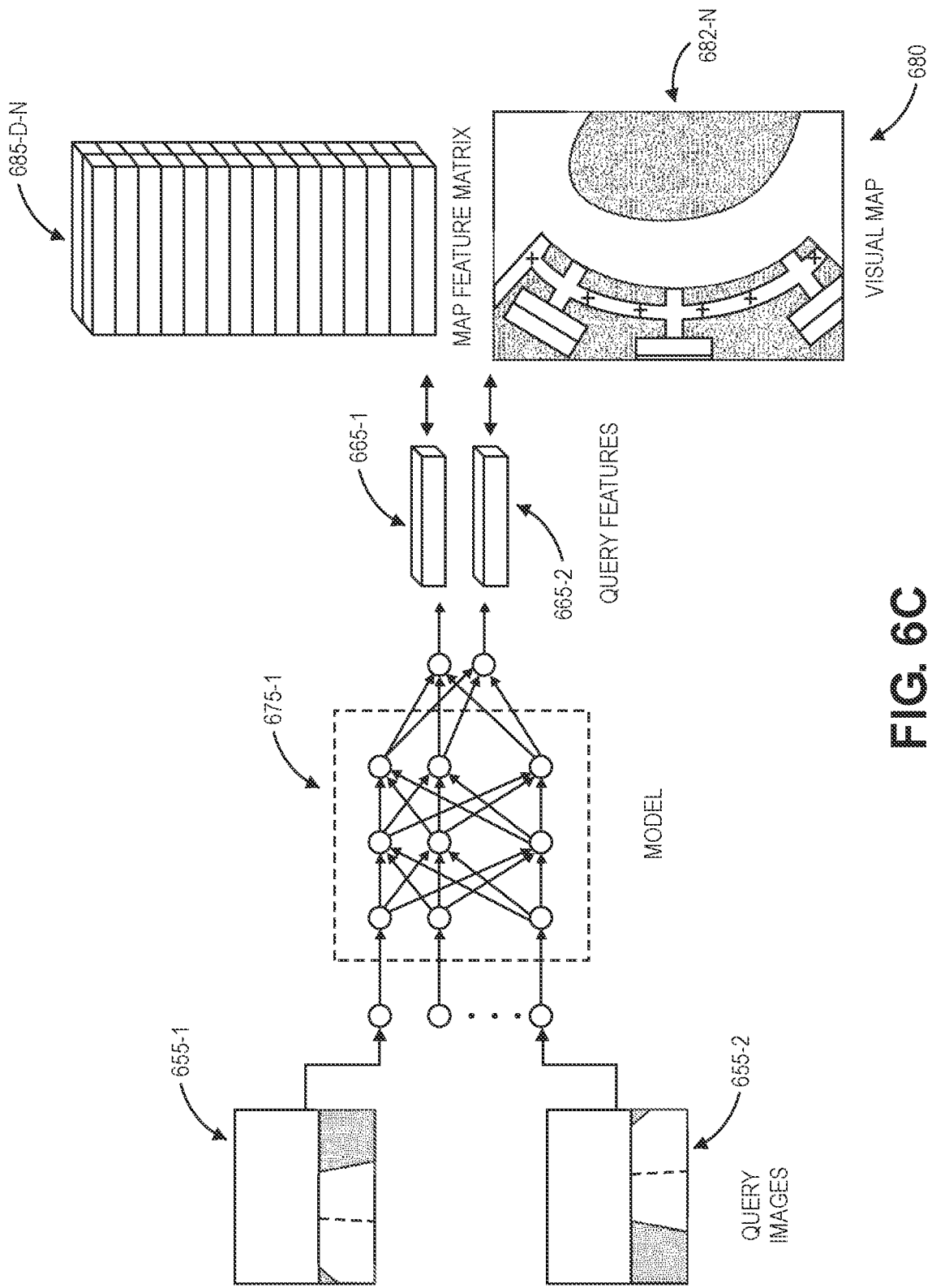

As is shown in FIG. 6C, the autonomous ground vehicle 650 processes the query images 655-1, 655-2, e.g., by providing the query images 655-1, 655-2 to a machine learning model 675-1 executed by one or more processor units provided aboard the autonomous ground vehicle 650. The machine learning model 675-1 may be an artificial neural network, such as a convolutional neural network, or any other model. The machine learning model 675-1 may generate a set of query features 665-1, 665-2 based on outputs received in response to inputs including the query images 655-1, 655-2. Alternatively, in some implementations, the query images 655-1, 655-2 may be pre-processed prior to providing the query images 655-1, 655-2 to the machine learning model 675-1 as inputs. Likewise, in some implementations, outputs received from the machine learning model 675-1 may be processed according to a principal component analysis or in any other manner, and the query features 665-1, 665-2 may be generated based on an output resulting from such an analysis.

As is further shown in FIG. 6C, the query features 665-1, 665-2 derived from the query images 655-1, 655-2 may be compared to the visual map 680, including the map points 682-N and the map feature matrix 685-D-N. For example, in some implementations, Euclidean distances may be calculated between each of the query features 665-1, 665-2 and each of the visual features of the map feature matrix 685-D-N.

Figure 6D:
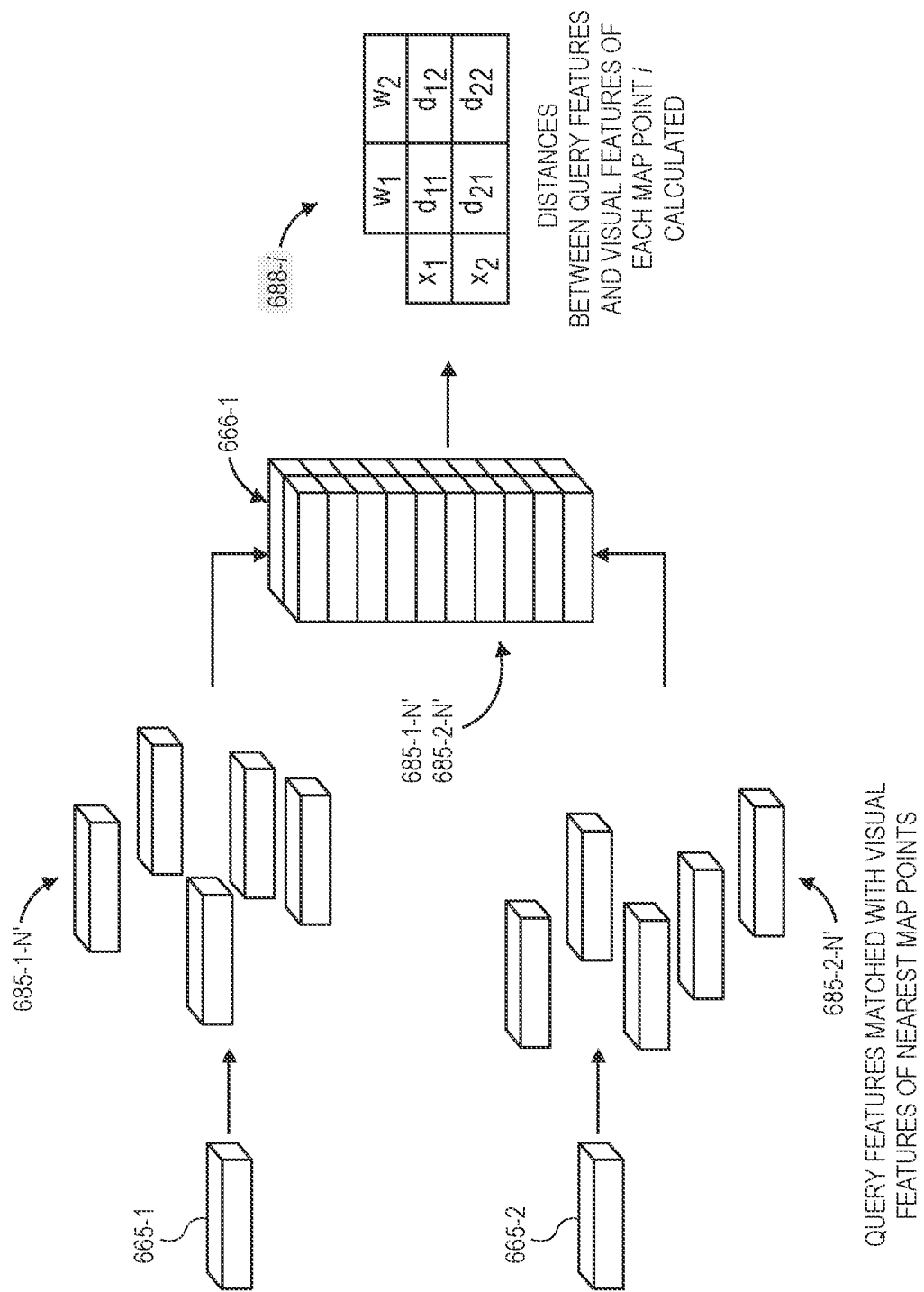

As is shown in FIG. 6D, a predetermined number N' of the visual features of the map feature matrix 685-D-N, or visual features 685-1-N', may be identified for the query feature 665-1. Likewise, a predetermined number N' of the visual features of the map feature matrix 685-D-N, or visual features 685-2-N', may be identified for the query feature 665-2. The visual features 685-1-N', 685-2-N' may be aggregated into a set 666-1 of visual features of the N'' map points. The position P(x,y,z) of the autonomous ground vehicle 650 may be determined to be a position of one of the N''' map points of the set 666-1.

In some implementations, a set 668-$i$ of distances between each of the visual features 685-1-N', 685-2-N' of the set 666-1 and each of the query features 665-1, 665-2, or $w_1$, $w_2$, may be calculated for each map point i of the N'' map points. For example, in some implementations, the distances of the set 668-$i$ may be summed for each map point i of the N'' map points, and the one of the N'' map points having a smallest sum of minimum distances may be identified as corresponding to the position P(x,y,z).

Figure 6E:
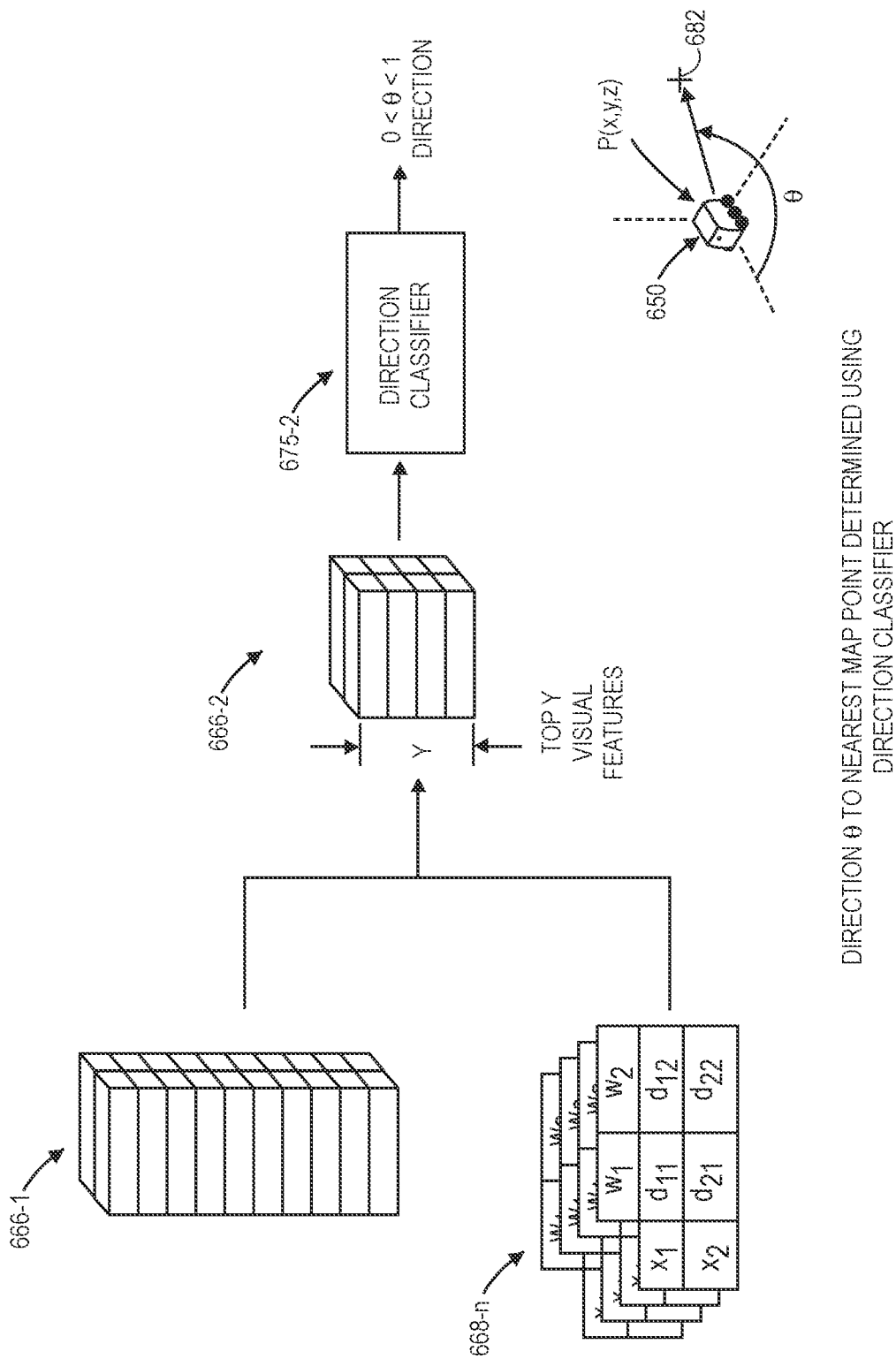

Additionally, as is shown in FIG. 6E, the set 666-1 of visual features of the N'' map points and distances 668-$n$ between the visual features of the set 666-1 and the query features 665-1, 665-2 may be processed to identify a set 666-2 of the top Y visual features. Once identified, the top Y visual features of the set 666-2 may be provided as inputs to a direction classifier 675-2 that is trained to determine a direction associated with the autonomous ground vehicle 650 based on outputs determined by the direction classifier 675-2. The outputs may identify an angle θ or direction to a position of a map point 682 from the position P(x,y,z) of the autonomous ground vehicle 650, or may otherwise identify a heading or an orientation of the autonomous ground vehicle 650 in any other manner. Once identified, the position P(x,y,z) of the autonomous ground vehicle 650 and the angle θ may be utilized for any purpose.

Figure 7:
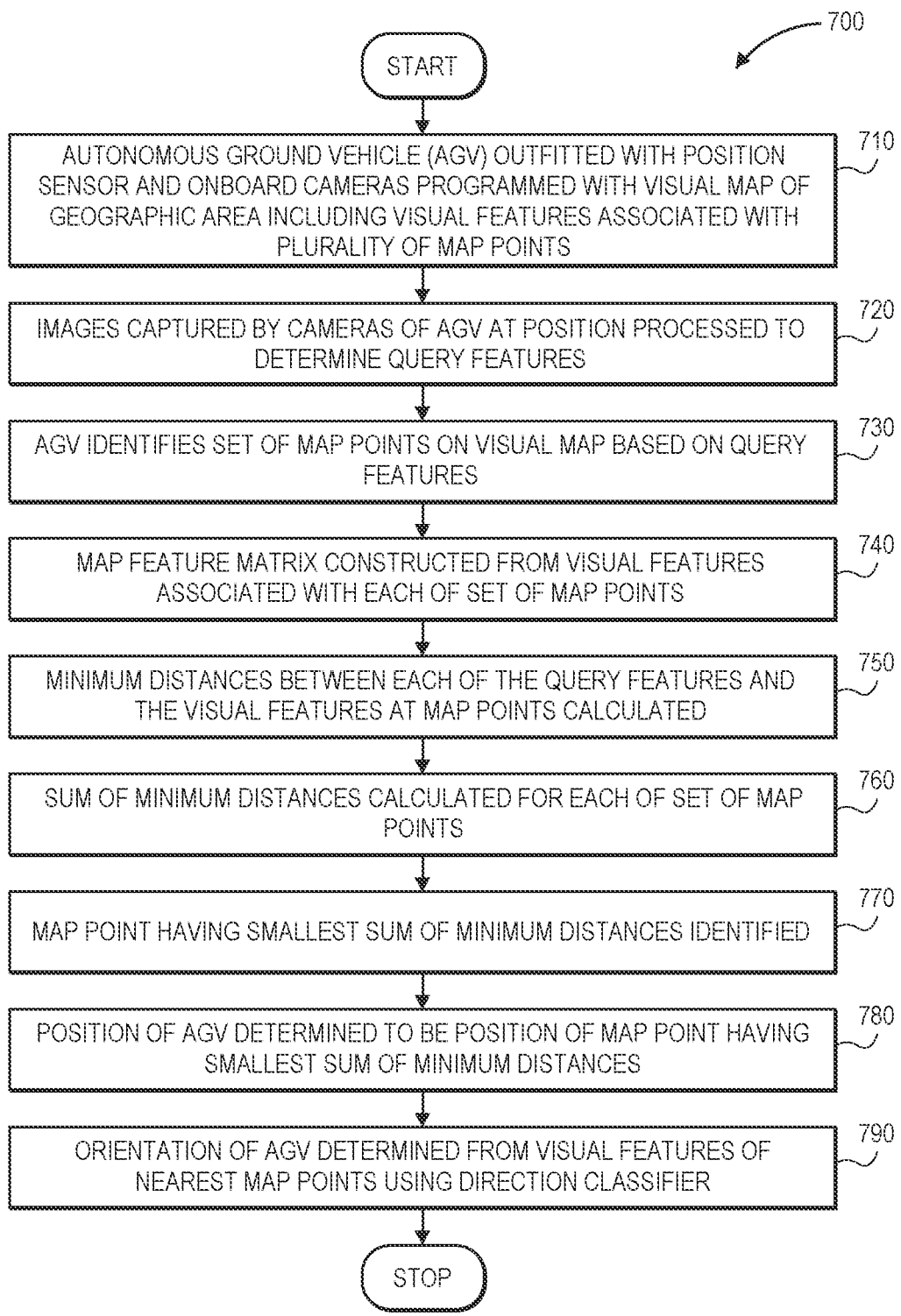
FIG. 7 is a flow chart of one process for visual localization of autonomous ground vehicles in accordance with implementations of the present disclosure.

Referring to FIG. 7, a flow chart 700 of one process for visual localization of autonomous ground vehicles in accordance with implementations of the present disclosure is shown. At box 710, an autonomous ground vehicle outfitted with a position sensor and one or more onboard cameras is programmed with a visual map of a geographic area that includes visual features associated with each of a plurality of map points.

At box 720, a plurality of images captured by cameras of the autonomous ground vehicle at a position are processed to determine query features of each of such images. For example, each of the plurality of images captured by the cameras may be provided as inputs to a machine learning model, e.g., an artificial neural network, such as a convolutional neural network, that is trained to extract sets of visual features from such images, and the query features may be determined from each of such images based on the outputs.

At box 730, the autonomous ground vehicle identifies a set of map points on the visual map based on the query features determined at box 720. For example, images captured by each of the cameras at the position may be processed to determine visual features therefrom, and the query features may be compared to visual features associated with one or more of the map points of the visual map.

The set of map points identified at box 720 may be determined from the map points of the visual map in any manner, and may include as a predetermined number of map points identified based on the query features determined from each of the images.

At box 740, a map feature matrix is constructed from the visual features associated with each of the map points of the set identified at box 730. For example, the map feature matrix may include sets of visual features of each of the map points of the set identified at box 730. The sets of visual features may have been determined from images captured by cameras of another vehicle, e.g., a mapping robot or mapping vehicle, at each of the map points.

In some implementations, the map feature matrix may have dimensions defined by the number of map points of the set, the number of sets of visual features associated with each of such map points, and a dimension of each of the visual features.

At box 750, minimum distances between the query features determined from the images captured at box 720 and visual features at the map points of the set are calculated. For example, in some implementations, the minimum distances may be calculated based on a multidimensional distance array having dimensions defined by the number of images captured by the autonomous mobile robot (or a number of sets of query features determined therefrom), a number of visual features associated with each of the map points, and a number of map points of the set.

At box 760, sums of the minimum distances are calculated for each of the map points of the set, and at box 770, the map point having the smallest sum of the minimum distances is identified. For example, for each of the map points, minimum distances between visual features of a map point and each of the query features are summed, and the one of the map points having the smallest sum is identified. The minimum distances may be calculated at box 750 and summed at box 760 for each of the map points in series, or for groups or sets of the map points (e.g., in chunks), to conserve processing power or for any other reason.

At box 780, the position of the autonomous ground vehicle is determined to be a position of the map point having the smallest sum of the minimum distances identified at box 770.

At box 790, an orientation of the autonomous ground vehicle is determined from the visual features of the nearest map points using a direction classifier, and the process ends. Subsequently, the position of the autonomous ground vehicle determined at box 780 and/or the orientation of the autonomous ground vehicle determined at box 790 may be used for any purpose.

Although some of the implementations of the present disclosure depict deliveries of items to destinations by one or more autonomous ground vehicles, those of ordinary skill in the pertinent arts will recognize that the systems and methods of the present disclosure are not so limited. Rather, the systems and methods of the present disclosure may be utilized in connection with any type of operations of one or more autonomous ground vehicles, and are not limited to deliveries of items.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 3, 5 and 7, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method comprising:
   causing a first ground vehicle to travel on at least one ground surface within a geographic area, wherein the first ground vehicle is equipped with a first plurality of cameras, and wherein each of the first plurality of cameras has an axis of orientation extending from the first ground vehicle that is fixed with respect to one or more principal axes of the first ground vehicle;
   capturing sets of images by the first plurality of cameras, wherein each of the sets of images includes images captured by each of the first plurality of cameras with the first ground vehicle at one of a plurality of positions on the at least one ground surface;
   processing each of the images of the sets of images to determine visual features from each of the images captured by the first plurality of cameras;
   generating a visual map, wherein the visual map comprises:
      a plurality of map points, wherein each of the map points represents one of the plurality of positions; and
      visual features determined from a set of images captured at the one of the plurality of positions;
   programming at least one memory component of a second ground vehicle with information regarding the visual map, wherein the second ground vehicle is equipped with a second plurality of cameras, and wherein each of the second plurality of cameras has an axis of orientation extending from the second ground vehicle that is fixed with respect to one or more principal axes of the second ground vehicle;
   transporting the second ground vehicle to the geographic area;
   capturing a set of images by the second plurality of cameras, wherein the set of images includes images captured by each of the second plurality of cameras with the second ground vehicle in a position on the at least one ground surface;
   processing each of the images of the set of images to determine visual features of the set of images captured by the second plurality of cameras;
   determining comparisons of the visual features of the set of images to the visual features of each of the sets of images of the visual map; and
   determining that the position on the at least one ground surface is one of the plurality of positions based at least in part on the comparisons.

2. The method of claim 1, wherein the first plurality of cameras comprises a first camera having a first axis of orientation fixed at a first angle with respect to the one or more principal axes of the first ground vehicle and a second camera having a second axis of orientation fixed at a second angle with respect to the one or more principal axes of the first ground vehicle, and
   wherein the second plurality of cameras comprises a third camera having a third axis of orientation fixed at the first angle with respect to the one or more principal axes of the second ground vehicle and a fourth camera having a fourth axis of orientation fixed at the second angle with respect to the one or more principal axes of the second ground vehicle.

3. The method of claim 1, wherein processing each of the images of the sets of images to determine visual features from each of the images comprises:
   providing each of the images as inputs to a convolutional neural network executed by one or more processors of the first ground vehicle, wherein each of the visual features is determined based at least in part on outputs received in response to the inputs, and
   wherein processing each of the images of the set of images to determine visual features from the set of images captured by the second plurality of cameras comprises:
   providing each of the images as inputs to the convolutional neural network executed by one or more processors of the second ground vehicle, wherein each of the visual features is determined based at least in part on outputs received in response to the inputs.

4. A method comprising:
   capturing a first image by a first camera provided aboard a first ground vehicle, wherein the first camera has a first field of view extending in a first direction with respect to at least one principal axis of the first ground vehicle, and wherein the first image is captured with the first ground vehicle at a first position and in a first orientation within a geographic area;
   capturing a second image by a second camera provided aboard the first ground vehicle, wherein the second camera has a second field of view extending in a second direction with respect to the at least one principal axis of the first ground vehicle, and wherein the second image is captured with the first ground vehicle at the first position;
   determining a first set of visual features of the first image by a processor unit provided aboard the first ground vehicle;
   determining a second set of visual features of the second image by the processor unit provided aboard the first ground vehicle;
   selecting one of a plurality of map points of a visual map associated with the geographic area based at least in part on the first set of visual features of the first image and the second set of visual features of the second image, wherein the visual map is programmed into at least one memory component of the first ground vehicle, and wherein the visual map comprises information regarding positions of the plurality of map points and sets of visual features associated with each of the plurality of map points, and orientations of the sets of visual features with respect to each of the plurality of map points;

determining that the first position is a position associated with the selected one of the plurality of map points based at least in part on the visual map; and determining a first orientation of the first ground vehicle based at least in part on at least one of the first set of visual features, at least one of the second set of visual features, and at least one visual feature associated with the selected one of the plurality of map points.

5. The method of claim 4, further comprising:

capturing images by a third camera provided aboard a second ground vehicle, wherein the third camera has a third field of view extending in a third direction with respect to at least one principal axis of the second ground vehicle, and wherein each of the images is captured by the third camera with the second ground vehicle at a position of one of the plurality of map points;

capturing images by a fourth camera provided aboard the second ground vehicle, wherein the fourth camera has a fourth field of view extending in a fourth direction with respect to at least one principal axis of the second ground vehicle, and wherein each of the images is captured by the fourth camera with the second ground vehicle at a position of one of the plurality of map points;

determining sets of visual features of each of the images captured by the third camera;

associating each of the sets of visual features of each of the images captured by the third camera with a position of the one of the plurality of map points at which each of the images were captured and an orientation of the third camera at the position;

determining sets of visual features of each of the images captured by the fourth camera;

associating each of the sets of visual features of each of the images captured by the fourth camera with a position of the one of the plurality of map points at which each of the images were captured and an orientation of the fourth camera at the position;

storing the visual map in at least one data store; and programming the visual map into the at least one memory component of the first ground vehicle, wherein the visual map is programmed into the at least one memory component of the first ground vehicle prior to capturing the first image by the first camera or the second image by the second camera.

6. The method of claim 5, wherein the first direction with respect to the at least one principal axis of the first ground vehicle is the same as the third direction with respect to the at least one principal axis of the second ground vehicle, and wherein the second direction with respect to the at least one principal axis of the first ground vehicle is the same as the fourth direction with respect to the at least one principal axis of the second ground vehicle.

7. The method of claim 4, further comprising:

capturing a third image by a third camera provided aboard the first ground vehicle, wherein the third camera has a third field of view extending in a third direction with respect to the at least one principal axis of the first ground vehicle, wherein the third image is captured with the first ground vehicle at the first position, and wherein the third direction is opposite the first direction;

capturing a fourth image by a fourth imaging device provided aboard the first ground vehicle, wherein the fourth camera has a fourth field of view extending in a fourth direction with respect to the at least one principal axis of the first ground vehicle, wherein the fourth image is captured with the first ground vehicle at the first position, and wherein the fourth direction is opposite the second direction;

determining a third set of visual features of the third image by the processor unit provided aboard the first ground vehicle; and determining a fourth set of visual features of the fourth image by the processor unit provided aboard the first ground vehicle, wherein the one of the plurality of map points of the visual map is selected based at least in part on the first set of visual features of the first image, the second set of visual features of the second image, the third set of visual features of the third image and the fourth set of visual features of the fourth image.

8. The method of claim 4, wherein determining the first set of visual features of the first image comprises:

providing at least the first image as a first input to a machine learning model executed by the processor unit;

receiving a first output from the machine learning model, wherein the first set of visual features is determined based at least in part on the first output;

providing at least the second image as a second input to the machine learning model executed by the processor unit; and receiving a second output from the machine learning model, wherein the second set of visual features is determined based at least in part on the second output.

9. The method of claim 8, wherein the machine learning model is a convolutional neural network.

10. The method of claim 8, further comprising:

performing a principal component analysis of at least a portion of the first output, wherein the first set of visual features is determined based at least in part on the principal component analysis of at least the portion of the first output; and performing a principal component analysis of at least a portion of the second output, wherein the second set of visual features is determined based at least in part on the principal component analysis of at least the portion of the second output.

11. The method of claim 4, wherein selecting the one of the plurality of map points comprises:

calculating first distances between each of the sets of visual features associated with each of the plurality of map points and the first set of visual features of the first image; and calculating second distances between each of the sets of visual features associated with each of the plurality of map points and the second set of visual features of the second image, wherein the one of the plurality of map points is selected based at least in part on at least some of the first distances, and wherein the one of the plurality of map points is selected based at least in part on at least some of the second distances.

12. The method of claim 11, further comprising:

selecting a first predetermined number of the plurality of map points based at least in part on the first distances; and selecting a second predetermined number of the plurality of map points based at least in part on the second distances,
wherein the one of the plurality of map points is in a group of the plurality of map points including the first predetermined number of the plurality of map points and the second predetermined number of the plurality of map points.

13. The method of claim 11, further comprising:
determining, for each of the plurality of map points, sums of one of the first distances associated with one of the plurality of map points and one of the second distances associated with the one of the plurality of map points; and
identifying a smallest one of the sums,
wherein the smallest one of the sums is determined for the selected one of the plurality of map points.

14. The method of claim 4, further comprising:
transporting the first ground vehicle to the geographic area to perform at least one mission within the geographical area.

15. The method of claim 14, wherein the first ground vehicle is equipped with a position sensor configured to determine a position of the first ground vehicle based at least in part on at least three position signals, and
wherein the method further comprises:
determining, with the first ground vehicle within the geographic area, that at least one position signal is not received by the position sensor,
wherein the first image is captured by the first camera and the second image is captured by the second camera in response to determining that the at least one position signal is not received by the position sensor with the first ground vehicle within the geographic area.

16. The method of claim 4, wherein the first ground vehicle further comprises:
a frame;
at least one wheel;
a motor disposed in association with the frame, wherein the motor is configured to cause the at least one wheel to rotate at a speed within a predetermined speed range;
at least one power module for powering the motor; and
a position sensor.

17. A first autonomous ground vehicle comprising:
a frame;
a first camera having a first field of view extending in a first direction from the frame;
a second camera having a second field of view extending in a second direction from the frame;
at least one wheel;
a motor disposed within the frame, wherein the motor is configured to cause the at least one wheel to rotate at a speed within a predetermined speed range;
a power module for powering at least the motor;
a position sensor;
at least one computer processor; and
at least one memory component having information regarding a visual map of a geographic area stored thereon, wherein the information regarding the visual map comprises:
a plurality of map points;
positions of the plurality of map points within the geographic area; and
sets of visual features associated with each of the plurality of map points, wherein each of the sets of visual features comprises a first visual feature associated with one of the plurality of map points and a second visual feature associated with the one of the plurality of map points;
wherein the at least one computer processor is configured to execute one or more sets of computer instructions for causing the first autonomous ground vehicle to execute a method comprising:
capturing a first image by the first camera, wherein the first image is captured with the first autonomous ground vehicle in a first position within the geographic area;
capturing a second image by the second camera, wherein the second image is captured with the first autonomous ground vehicle in the first position within the geographic area;
determining a set of visual features determined from the first image;
determining a set of visual features determined from the second image;
calculating a first set of distances, wherein each of the first set of distances is a Euclidean distance between the set of visual features determined from the first image and a first visual feature associated with one of the plurality of map points;
calculating a second set of distances, wherein each of the second set of distances is a Euclidean distance between the set of visual features determined from the second image and a second visual feature associated with the one of the plurality of map points;
identifying a subset of the plurality of map points based at least in part on the first set of distances and the second set of distances;
selecting one of the subset of the plurality of map points; and
determining that the first position corresponds to a position of the selected one of the subset of the plurality of map points.

18. The first autonomous ground vehicle of claim 17, wherein the method further comprises at least one of:
determining that at least one position signal is not received by the position sensor; or
determining that a position determined by the position sensor is unreliable,
wherein each of the first image and the second image is captured in response to determining that the at least one position signal is not received by the position sensor or determining that the position determined by the position sensor is unreliable.

19. The first autonomous ground vehicle of claim 17, wherein selecting the one of the subset of the plurality of map points comprises:
calculating, for each of the subset of the plurality of map points, a sum of:
a distance between the set of visual features determined from the first image and a first visual feature associated with the one of the subset of the plurality of map points; and
a distance between the set of visual features determined from the second image and a second visual feature associated with the one of the subset of the plurality of map points;
identifying one of the subset of the plurality of map points having a smallest sum, wherein the selected one of the subset of the plurality of map points is the one of the subset of the plurality of map points having the smallest sum.

20. The first autonomous ground vehicle of claim 17, wherein the first visual feature of each of the sets of visual features is determined from a first image captured by a second ground vehicle at a position of one of the plurality of map points, and wherein the second visual feature of each of the sets of visual features is determined from a second image captured by the second ground vehicle at the position of the one of the plurality of map points.

\* \* \* \* \*